(12) United States Patent
Wang et al.

(10) Patent No.: US 11,979,019 B2
(45) Date of Patent: May 7, 2024

(54) DIRECT CURRENT BREAKER FEEDING AN INVERTER

(71) Applicant: Huawei Digital Power Technologies Co., Ltd., Shenzhen (CN)

(72) Inventors: Xun Wang, Shanghai (CN); Zhen Cao, Shanghai (CN); Yongbing Gao, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 295 days.

(21) Appl. No.: 17/446,492

(22) Filed: Aug. 31, 2021

(65) Prior Publication Data

US 2021/0391709 A1    Dec. 16, 2021

Related U.S. Application Data

(63) Continuation of application No. PCT/CN2020/077346, filed on Feb. 29, 2020.

(30) Foreign Application Priority Data

Mar. 1, 2019 (CN) .......................... 201910157622.8
Jul. 16, 2019 (CN) .......................... 201910640519.9

(51) Int. Cl.
*H02H 7/122* (2006.01)
*H02H 7/12* (2006.01)

(52) U.S. Cl.
CPC .......... *H02H 7/122* (2013.01); *H02H 7/1213* (2013.01)

(58) Field of Classification Search
CPC ................... H02H 7/1213; H02H 7/122–1227
See application file for complete search history.

(56) References Cited

U.S. PATENT DOCUMENTS

2006/0279893 A1    12/2006  Komatsu et al.
2014/0293666 A1    10/2014  Merz et al.
(Continued)

FOREIGN PATENT DOCUMENTS

CN        101277085 A     10/2008
CN        201408976 Y      2/2010
(Continued)

*Primary Examiner* — Peter M Novak
(74) *Attorney, Agent, or Firm* — WOMBLE BOND DICKINSON (US) LLP

(57) ABSTRACT

A breaker apparatus and an inverter system are configured to disconnect an electrical connection when a fault occurs in a protected circuit. The breaker apparatus is connected in series in a protected circuit, and is configured to disconnect the electrical connection when a fault occurs in the protected circuit. The breaker apparatus includes a first branch, and a second branch. The first branch includes an overcurrent-automatic-disconnection unit and a first current limiting unit that are connected in series, where the overcurrent-automatic-disconnection unit is configured to be automatically disconnected when a current flowing through the overcurrent-automatic-disconnection unit exceeds a breaking current threshold. The a second branch is configured to be open or closed under control of the controller. The controller is configured to control the first controllable switch unit to be closed when the protected circuit operates normally, and control the first controllable switch unit to be open when a fault occurs in the protected circuit.

19 Claims, 11 Drawing Sheets

(56) References Cited

U.S. PATENT DOCUMENTS

| | | | | |
|---|---|---|---|---|
| 2015/0102671 A1* | 4/2015 | Rivera | ................... | H02J 5/00 363/126 |
| 2018/0175605 A1 | 6/2018 | Qi et al. | | |

FOREIGN PATENT DOCUMENTS

| | | | |
|---|---|---|---|
| CN | 204205670 U | 3/2015 | |
| CN | 104953535 A | 9/2015 | |
| CN | 204615371 U | 9/2015 | |
| CN | 105262323 A | 1/2016 | |
| CN | 105790370 A | 7/2016 | |
| CN | 106026229 A | 10/2016 | |
| CN | 207652031 U | 7/2018 | |
| CN | 108872844 A | 11/2018 | |
| CN | 208226541 U | 12/2018 | |
| CN | 208522457 U | 2/2019 | |
| CN | 110048373 A | 7/2019 | |
| CN | 110364993 A | 10/2019 | |
| EP | 3010030 A1 | 4/2016 | |
| JP | 2002163968 A | 6/2002 | |
| JP | 2007267473 A | 10/2007 | |
| WO | 2011070235 A1 | 6/2011 | |

* cited by examiner

DIRECT CURRENT BREAKER FEEDING AN INVERTER

CROSS-REFERENCE TO RELATED APPLICATIONS

This application is a continuation of International Application No. PCT/CN2020/077346, filed on Feb. 29, 2020, which claims priorities to Chinese Patent Application No. 201910157622.8, filed on Mar. 1, 2019 and Chinese Patent Application No. 201910640519.9, filed on Jul. 16, 2019. All of the aforementioned patent applications are hereby incorporated by reference in their entireties.

TECHNICAL FIELD

This application relates to the field of power electronics technologies, and in particular, to a breaker apparatus (e.g., a device for opening a circuit) and an inverter system.

BACKGROUND

Currently, in a photovoltaic power plant, photovoltaic modules are usually connected in series and then connected to an inverter, and the inverter converts a direct current output by the photovoltaic module into an alternating current, and then transmits the alternating current to a power grid. A direct current voltage output by the photovoltaic module is up to several hundred volts or even thousands of volts. When a fault occurs inside the inverter, if the photovoltaic module continuously injects energy into the inverter, the fault is easily escalated or even damages the inverter. Therefore, a breaker apparatus that can reliably and quickly disconnect an electrical connection between the photovoltaic module and the inverter is required.

Moreover, a power system other than the inverter system (including the photovoltaic module and the inverter) described above, especially a high-power power system, also needs such a breaker apparatus, to disconnect an electrical connection of a protected circuit when a fault occurs in the protected circuit.

For example, an existing breaker apparatus may be shown in FIG. 1. The breaker apparatus is applied to an inverter system. The inverter system includes a photovoltaic string including a plurality of photovoltaic panels, a breaker apparatus, and an inverter (equivalent to a protected circuit). The inverter includes a DC/DC conversion unit and a DC/AC conversion unit. As shown in FIG. 1, the breaker apparatus includes a fuse and a relay connected in parallel. When the DC/DC conversion unit operates normally, a controller controls the relay to be closed. In this case, an output current of the photovoltaic string is shunted based on a proportional relationship between internal resistance of the relay and internal resistance of the fuse. When the DC/DC conversion unit is faulty, the controller controls the relay to be open. In this case, an output current of the photovoltaic string all flows through the fuse, and the fuse is blown passively. In this way, the DC/DC conversion unit is disconnected from the photovoltaic string.

However, in an actual application, the breaker apparatus shown in FIG. 1 has the following problem: During normal operation, the output current of the photovoltaic string is shunted based on the proportional relationship between the internal resistance of the relay and the internal resistance of the fuse. Therefore, a considerable part of the current flows through the fuse, causing the fuse to heat up. This reduces a service life of the fuse, and further affects reliability of the breaker apparatus.

In conclusion, in the solution provided in the conventional technology, reliability of the breaker apparatus is low.

SUMMARY

Embodiments of this application provide a breaker apparatus and an inverter system, to disconnect an electrical connection when a fault occurs in a protected circuit.

According to a first aspect, an embodiment of this application provides a breaker apparatus. The breaker apparatus is connected in series in a protected circuit, and is configured to disconnect an electrical connection when a fault occurs in the protected circuit. The breaker apparatus includes a first branch, including an overcurrent-automatic-disconnection unit and a first current limiting unit that are connected in series, where the overcurrent-automatic-disconnection unit is configured to be automatically disconnected when a current flowing through the overcurrent-automatic-disconnection unit exceeds a breaking current threshold, and the first current limiting unit is configured to limit a current on the first branch; a second branch, connected in parallel to the first branch and including a first controllable switch unit, where a control terminal of the first controllable switch unit is connected to a controller, and the first controllable switch unit is configured to be open or closed under control of the controller; and the controller, connected to the control terminal of the first controllable switch unit and the protected circuit, and configured to: when the protected circuit operates normally, control the first controllable switch unit to be closed, and when a fault occurs in the protected circuit, control the first controllable switch unit to be open.

In the breaker apparatus provided in the first aspect, when the protected circuit operates normally, the controller controls the first controllable switch unit to be closed. In this case, the first branch and the second branch are shunted. Because the first current limiting unit can provide a current limiting function, a value of a current flowing through the first branch is relatively small. Reducing the current flowing through the overcurrent-automatic-disconnection unit can alleviate a heating phenomenon of the overcurrent-automatic-disconnection unit and improve a service life of the overcurrent-automatic-disconnection unit. When a fault occurs in the protected circuit, the controller controls the first controllable switch unit to be open. In this case, the second branch is cut off, the current flowing through the overcurrent-automatic-disconnection unit exceeds the breaking current threshold of the overcurrent-automatic-disconnection unit, and the overcurrent-automatic-disconnection unit is automatically disconnected, thereby achieving disconnection of the protected circuit. Therefore, the breaker apparatus can be used to disconnect the electrical connection of the protected circuit when a fault occurs in the protected circuit. Compared with the solution provided in the conventional technology, the breaker apparatus provided in the first aspect includes an overcurrent-automatic-disconnection unit with less heating, and therefore has higher reliability.

In an embodiment, the controller is connected to the first branch, and the controller is further configured to: when the protected circuit is powered on, if a voltage value at two ends of the first branch is less than a preset voltage value, control the first controllable switch unit to be closed.

In the foregoing solution, the voltage value at the two ends of the first branch is a voltage value at two ends of the second branch, and if the voltage value at the two ends of the first branch is less than the preset voltage value, the first controllable switch unit is controlled to be closed. In other words, if a voltage at two ends of the first controllable switch unit is relatively small, the first controllable switch unit is controlled to be closed, so that the first controllable switch unit can be closed at a voltage of zero or close to zero, thereby reducing a requirement on a voltage withstand capability of the first controllable switch unit. Therefore, during implementation, a first controllable switch unit with a relatively small specification may be selected for use, to reduce an area occupied by the breaker apparatus and reduce costs of the breaker apparatus.

For example, the first controllable switch unit is any one or any series or parallel combination of the following: a relay, a contactor, and a semiconductor switch.

For example, the first current limiting unit is any one or any series or parallel combination of the following: a resistor, a diode, a positive temperature coefficient (PTC) thermistor, and a negative temperature system NTC thermistor.

For example, the overcurrent-automatic-disconnection unit is any one or any series or parallel combination of the following:

a circuit breaker and a fuse.

In addition, the controller may be connected to the first branch, and the controller is further configured to: when a voltage value at two ends of the first branch meets a preset condition, control the first controllable switch unit to be alternately open and closed, to clean the first controllable switch unit.

Because the first controllable switch unit is closed at a voltage of zero or close to zero, an oxide film is easily formed between contacts. In the foregoing solution, when the voltage value at the two ends of the first branch (that is, the voltage value at the two ends of the first controllable switch unit) meets the preset condition, the first controllable switch unit is controlled to be alternately open and closed, so that the first controllable switch unit can be cleaned, thereby reducing an impedance of the first controllable switch unit, and alleviating a heating problem of the overcurrent-automatic-disconnection unit.

According to a second aspect, an embodiment of this application provides a breaker apparatus. The breaker apparatus is connected in series in a protected circuit, and is configured to disconnect an electrical connection when a fault occurs in the protected circuit. The breaker apparatus includes: a first branch, including an overcurrent-automatic-disconnection unit, a cleaning circuit, and a first current limiting unit that are connected in series, where the overcurrent-automatic-disconnection unit is configured to be automatically disconnected when a current flowing through the overcurrent-automatic-disconnection unit exceeds a breaking current threshold, the first current limiting unit is configured to limit a current on the first branch, the cleaning circuit includes a second current limiting unit and a second controllable switch unit that are connected in parallel, a control terminal of the second controllable switch unit is connected to a controller, and the second controllable switch unit is configured to be open or closed under control of the controller; a second branch, connected in parallel to the first branch and including a first controllable switch unit, where a control terminal of the first controllable switch unit is connected to the controller, and the first controllable switch unit is configured to be open or closed under control of the controller; and the controller, connected to the control terminal of the first controllable switch unit, the control terminal of the second controllable switch unit, and the protected circuit, and configured to: when the protected circuit operates normally, control the first controllable switch unit to be closed and the second controllable switch unit to be closed, and when a fault occurs in the protected circuit, control the first controllable switch unit to be open and the second controllable switch unit to be closed.

In the foregoing solution, in the breaker apparatus, when the protected circuit operates normally, the controller controls the first controllable switch unit and the second controllable switch unit to be closed. In this case, the first branch and the second branch are shunted. Because the first current limiting unit and the cleaning circuit can provide a current limiting function, a value of a current flowing through the first branch is relatively small. Reducing the current flowing through the overcurrent-automatic-disconnection unit can alleviate a heating phenomenon of the overcurrent-automatic-disconnection unit and improve a service life of the overcurrent-automatic-disconnection unit. When a fault occurs in the protected circuit, the controller controls the first controllable switch unit to be open and the second controllable switch unit to be closed. In this case, the second branch is cut off, the current flowing through the overcurrent-automatic-disconnection unit exceeds the breaking current threshold of the overcurrent-automatic-disconnection unit, and the overcurrent-automatic-disconnection unit is automatically disconnected, thereby disconnecting the electrical connection of the protected circuit. Therefore, the breaker apparatus provided in the second aspect can be used to disconnect the electrical connection of the protected circuit when a fault occurs in the protected circuit. Compared with the solution provided in the conventional technology, the breaker apparatus provided in the second aspect includes an overcurrent-automatic-disconnection unit with less heating, and therefore has higher reliability.

A default state of the second controllable switch unit is a closed state.

In other words, the second controllable switch unit is in the closed state when a system operates normally and a fault occurs in the protected circuit, and the second controllable switch unit is in an open state only during cleaning of the first controllable switch unit, to implement low-current cleaning.

In an embodiment, the controller is further configured to: when the first controllable switch unit needs to be cleaned, control the second controllable switch unit to be open, and if it is detected that a voltage value at two ends of the first branch meets a preset condition, control the first controllable switch unit to be alternately open and closed.

In the foregoing solution, when the first controllable switch unit is being cleaned, a relatively large current is not required to flow in the system. When the first controllable switch unit needs to be cleaned (in other words, when the voltage value at the two ends of the first branch meets the preset condition), the controller controls the second controllable switch unit to be open. In this case, both the first current limiting unit and the second current limiting unit provide a current limiting function. Therefore, in the breaker apparatus provided in the second aspect, shunting of the second branch is relatively large. Therefore, if a current in the system is relatively small, a voltage value of the first controllable switch unit more easily meets the preset condition, thereby more easily triggering cleaning of the first controllable switch unit.

For example, the first controllable switch unit is any one or any series or parallel combination of the following: a relay, a contactor, and a semiconductor switch; and the second controllable switch unit is any one or any series or parallel combination of the following: a relay; a contactor, and a semiconductor switch.

For example, the first current limiting unit is any one or any series or parallel combination of the following: a resistor, a diode, a positive temperature coefficient PTC thermistor, and a negative temperature system NTC thermistor; and the second current limiting unit is any one or any series or parallel combination of the following: a resistor, a diode, a PTC thermistor, and an NTC thermistor.

For example, the overcurrent-automatic-disconnection unit is any one or any series or parallel combination of the following:

a circuit breaker and a fuse.

In addition, the controller may be connected to the first branch, and the controller is further configured to: when the protected circuit is powered on, if a voltage value at two ends of the first branch is less than a preset voltage value, control the first controllable switch unit to be closed.

In the foregoing solution, the voltage value at the two ends of the first branch is a voltage value at two ends of the second branch, and if the voltage value at the two ends of the first branch is less than the preset voltage value, the first controllable switch unit is controlled to be closed. In other words, if a voltage at two ends of the first controllable switch unit is relatively small, the first controllable switch unit is controlled to be closed, so that the first controllable switch unit can be closed at a voltage of zero or close to zero, thereby reducing a requirement on a voltage withstand capability of the first controllable switch unit. Therefore, during implementation, a first controllable switch unit with a relatively small specification may be selected for use, to reduce an area occupied by the breaker apparatus and reduce costs of the breaker apparatus.

According to a third aspect, an embodiment of this application provides an inverter system. The inverter system includes at least one direct current input terminal, at least one breaker apparatus, a bus unit, and a DC/AC conversion unit. The breaker apparatus is connected in series between a negative electrode of the direct current input terminal and a negative electrode of the bus unit, and a positive electrode of the direct current input terminal is connected to a positive electrode of the bus unit. Alternatively, the breaker apparatus is connected in series between a positive electrode of the direct current input terminal and a positive electrode of the bus unit, and a negative electrode of the direct current input terminal is connected to a negative electrode of the bus unit. Alternatively, the breaker apparatus is connected in series between negative electrodes of some direct current input terminals and a negative electrode of the bus unit, and a positive electrode of the direct current input terminal is connected to a positive electrode of the bus unit. Alternatively, the breaker apparatus is connected in series between positive electrodes of some direct current input terminals and a positive electrode of the bus unit, and a negative electrode of the direct current input terminal is connected to a negative electrode of the bus unit. Alternatively, some breaker apparatuses are connected in series between a negative electrode of the direct current input terminal and a negative electrode of the bus unit, and some other breaker apparatuses are connected in series between a positive electrode of the direct current input terminal and a positive electrode of the bus unit. The bus unit is connected to the DC/AC conversion unit.

The breaker apparatus includes: a first branch, including an overcurrent-automatic-disconnection unit and a first current limiting unit that are connected in series, where the overcurrent-automatic-disconnection unit is configured to be automatically disconnected when a current flowing through the overcurrent-automatic-disconnection unit exceeds a breaking current threshold, and the first current limiting unit is configured to limit a current on the first branch; a second branch, connected in parallel to the first branch and including a first controllable switch unit, where a control terminal of the first controllable switch unit is connected to a controller, and the first controllable switch unit is configured to be open or closed under control of the controller; and the controller, connected to the control terminal of the first controllable switch unit, and configured to: when the inverter system operates normally, control the first controllable switch unit to be closed, and when a fault occurs in the inverter system, control the first controllable switch unit to be open.

The first controllable switch unit may be any one or any series or parallel combination of the following: a relay, a contactor, and a semiconductor switch. The first current limiting unit may be any one or any series or parallel combination of the following: a resistor, a diode, a positive temperature coefficient PTC thermistor, and a negative temperature system NTC thermistor. The overcurrent-automatic-disconnection unit may be any one or any series or parallel combination of the following: a circuit breaker and a fuse.

In an embodiment, the controller is connected to the first branch, and the controller is further configured to: when a voltage value at two ends of the first branch meets a preset condition, control the first controllable switch unit to be alternately open and closed, to clean the first controllable switch unit.

In an embodiment, the first branch further includes a cleaning circuit. The cleaning circuit includes a second current limiting unit and a second controllable switch unit that are connected in parallel. A control terminal of the second controllable switch unit is connected to the controller, and the second controllable switch unit is configured to be open or closed under control of the controller. The controller is further configured to: when the inverter system operates normally and when a fault occurs in the inverter system, control the second controllable switch unit to be closed; and when the first controllable switch unit needs to be cleaned, control the second controllable switch unit to be open, and if it is detected that a voltage value at two ends of the first branch meets a preset condition, control the first controllable switch unit to be alternately open and closed.

A default state of the second controllable switch unit is a closed state.

In an embodiment, the inverter system further includes at least one DC/DC conversion unit that is in a one-to-one correspondence with the at least one direct current input terminal. A positive output terminal of the DC/DC conversion unit is connected to the positive electrode of the bus unit. A negative output terminal of the DC/DC conversion unit is connected to the negative electrode of the bus unit.

In an embodiment, the breaker apparatus is connected in series between the negative electrode of the direct current input terminal and a negative input terminal of the DC/DC conversion unit, and the positive electrode of the direct current input terminal is connected to a positive input terminal of the DC/DC conversion unit. Alternatively, the breaker apparatus is connected in series between the positive electrode of the direct current input terminal and a positive input terminal of the DC/DC conversion unit, and the negative electrode of the direct current input terminal is connected to a negative input terminal of the DC/DC conversion unit. Alternatively, the breaker apparatus is connected in series between the negative electrode of the direct current input terminal and negative input terminals of some DC/DC conversion units, and the positive electrode of the direct current input terminal is connected to a positive input terminal of the DC/DC conversion unit. Alternatively, the breaker apparatus is connected in series between the positive electrode of the direct current input terminal and positive input terminals of some DC/DC conversion units, and the negative electrode of the direct current input terminal is connected to a negative input terminal of the DC/DC conversion unit. Alternatively, some breaker apparatuses are connected in series between the negative electrode of the direct current input terminal and a negative input terminal of the DC/DC conversion unit, and some other breaker apparatuses are connected in series between the positive electrode of the direct current input terminal and a positive input terminal of the DC/DC conversion unit.

It should be noted that, in the inverter system provided in the third aspect, the solutions provided in different design manners in the first aspect or the second aspect may alternatively be used for the breaker apparatus. Details are not described herein again.

In addition, for a technical effect of any design manner in the third aspect, refer to technical effects of different design manners in the first aspect or the second aspect. Details are not described herein again.

DESCRIPTION OF EMBODIMENTS

In view of the problem raised in the background, embodiments of this application provide a breaker apparatus and an inverter system, to disconnect an electrical connection when a fault occurs in a protected circuit.

Figure 1:
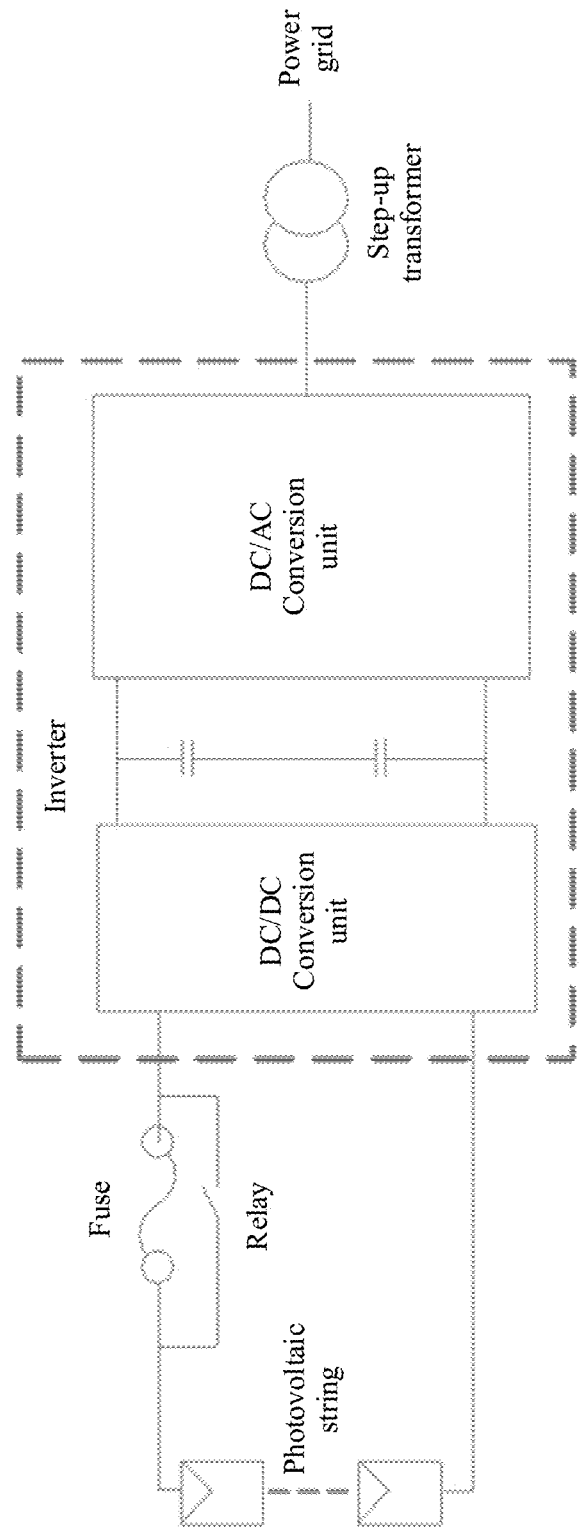
FIG. 1 is a schematic structural diagram of a breaker apparatus according to the conventional technology.
Figure 2:
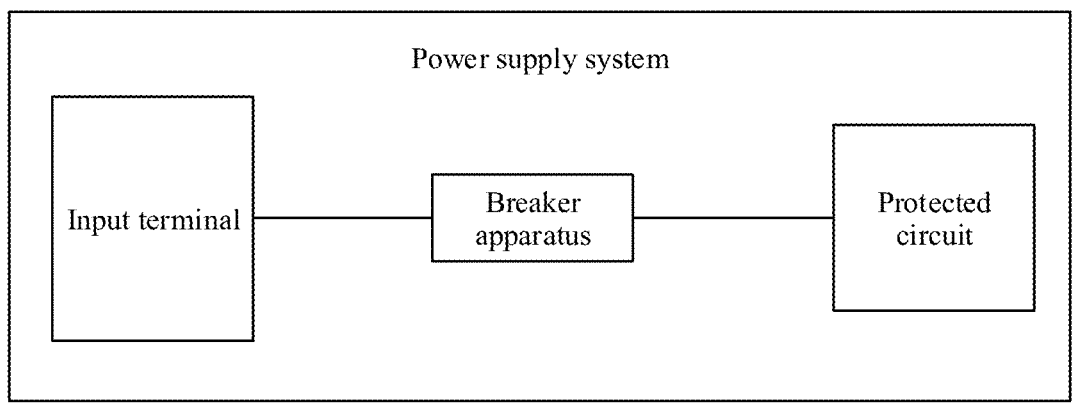
FIG. 2 is a schematic structural diagram of a power system according to an embodiment of this application.

The following briefly describes an application scenario of an embodiment of this application by using FIG. 2 as an example.

The embodiments of this application may be applied to a power system shown in FIG. 2. As shown in FIG. 2, the power system includes an input terminal, a breaker apparatus, and a protected circuit. The input terminal is configured to input electric energy, and may be, for example, a direct current input terminal or an alternating current input terminal. The breaker apparatus is separately connected to the input terminal and the protected circuit, and is configured to disconnect an electrical connection between the input terminal and the protected circuit when a fault occurs in the protected circuit. The breaker apparatus may be considered as an independent apparatus, or may be considered as a part of the protected circuit.

Specifically, the breaker apparatus is connected in series between a negative electrode of the input terminal and a negative electrode of the protected circuit, and a positive electrode of the input terminal is connected to a positive electrode of the protected circuit. Alternatively, the breaker apparatus is connected in series between a positive electrode of the input terminal and a positive electrode of the protected circuit, and a negative electrode of the input terminal is connected to a negative electrode of the protected circuit. Alternatively, some breaker apparatuses are connected in series between a negative electrode of the input terminal and a negative electrode of the protected circuit, and some other breaker apparatuses are connected in series between a positive electrode of the input terminal and a positive electrode of the protected circuit.

When the system operates normally, the input terminal inputs electric energy to the system, and the electric energy is transmitted to the protected circuit through the breaker apparatus. The protected circuit may perform corresponding processing on output power of the input terminal. For example, the protected circuit may perform direct current/alternating current (DC/AC) conversion on a direct current at the input terminal, to output an alternating current. For example, the protected circuit may perform direct current/direct current (DC/DC) conversion on a direct current at the input terminal, to output a direct current whose voltage and current are adjustable. For another example, the protected circuit may perform alternating current/direct current (AC/DC) conversion on alternating current at the input terminal, to output a direct current.

Figure 3:
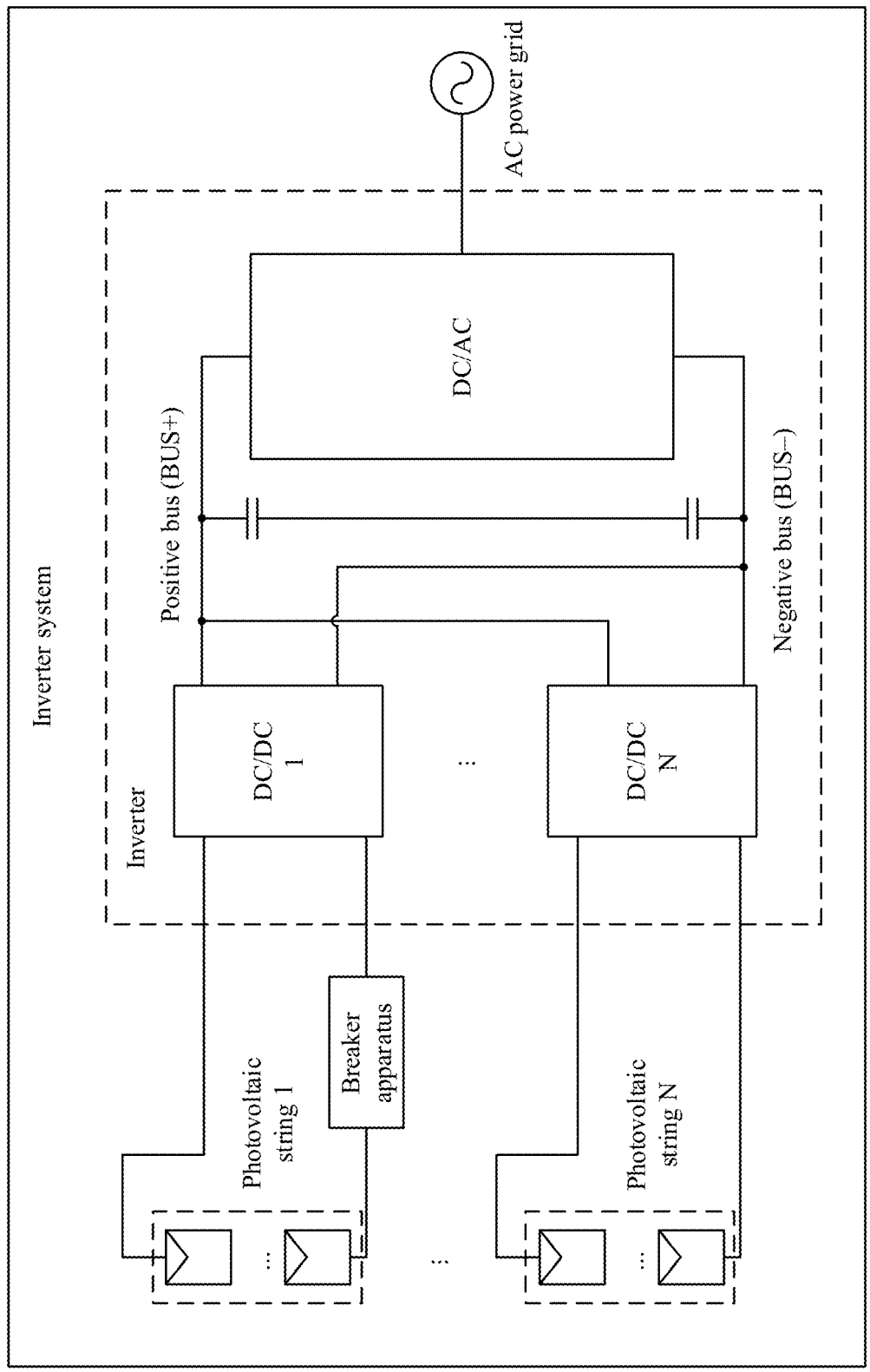
FIG. 3 is a schematic structural diagram of a first inverter system according to an embodiment of this application.

For example, the power system shown in FIG. 2 may be an inverter system. Referring to FIG. 3, the inverter system may include N photovoltaic strings, a breaker apparatus, and an inverter. Each photovoltaic string includes a plurality of photovoltaic panels connected in series. The inverter includes N DC/DC conversion units in a one-to-one correspondence with the N photovoltaic strings, a bus unit (BUS), and one DC/AC conversion unit. The breaker apparatus is connected in series between the negative electrode of the input terminal and the negative electrode of the protected circuit, and the positive electrode of the input terminal is connected to the positive electrode of the protected circuit. The breaker apparatus is configured to disconnect an electrical connection between the photovoltaic string and the DC/DC conversion unit when a fault occurs in the DC/DC conversion unit. The N DC/DC conversion units are connected in parallel to the bus unit. The bus unit is connected to the DC/AC conversion unit.

It should be noted that in FIG. 3, that the inverter system includes one breaker apparatus is merely used as an example for illustration. In an actual application, alternatively N breaker apparatuses may be disposed in the inverter system, and the N breaker apparatuses respectively protect the N DC/DC conversion units. In other words, in the inverter system, a quantity of disposed breaker apparatuses may be inconsistent with a quantity of DC/DC conversion units. In addition, in the example of FIG. 3, the breaker apparatus is located on a negative power cable. In an actual application, the breaker apparatus may alternatively be located on a positive power cable, or a breaker apparatus may be disposed on both a positive power cable and a negative power cable. This is not specifically limited in this embodiment of this application.

To make the objectives, technical solutions, and advantages of this application clearer, the following further describes this application in detail with reference to the accompanying drawings.

It should be noted that "a plurality of" refers to two or more than two in this application. In addition, it should be understood that in descriptions of this application, terms such as "first" and "second" are used only for purposes of distinguishing descriptions, and should not be construed as indicating or implying relative importance, nor as indicating or implying an order.

Figure 4:
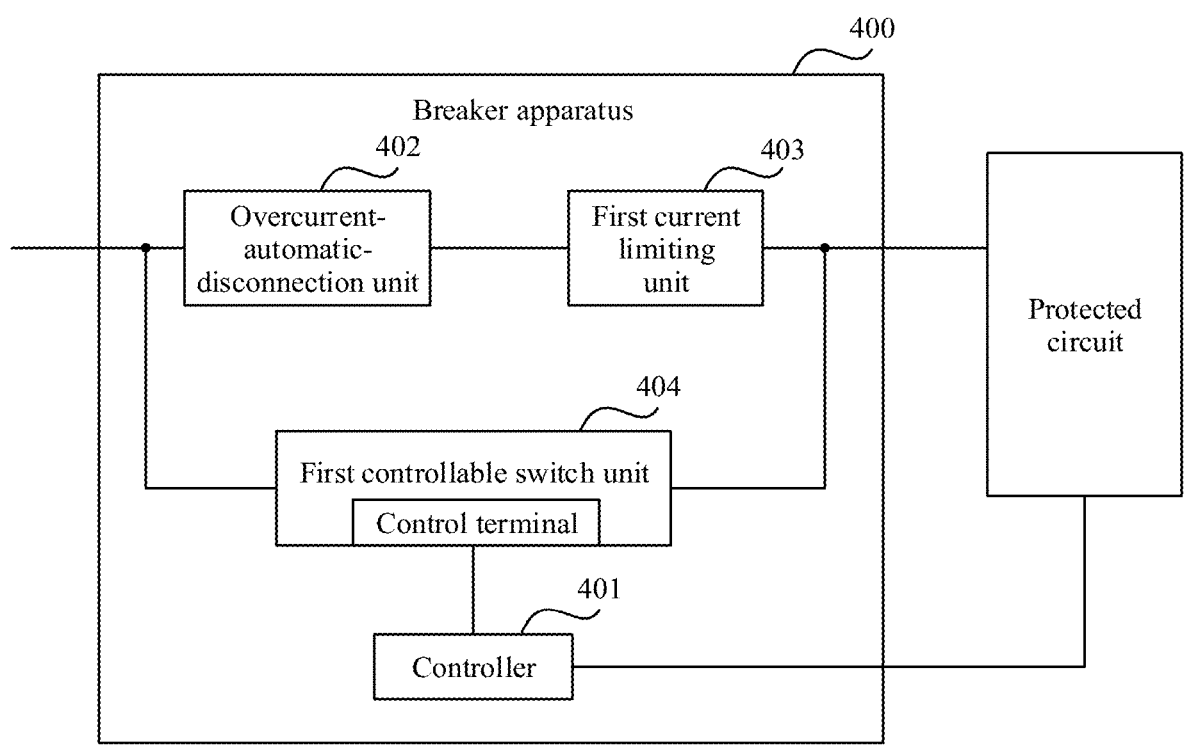
FIG. 4 is a schematic structural diagram of a first breaker apparatus according to an embodiment of this application.

FIG. 4 is a schematic structural diagram of a breaker apparatus according to an embodiment of this application. The breaker apparatus 400 shown in FIG. 4 includes a controller 401, a first branch, and a second branch connected in parallel with the first branch. The breaker apparatus 400 is connected in series in a protected circuit, and is configured to disconnect an electrical connection when a fault occurs in the protected circuit.

The first branch includes an overcurrent-automatic-disconnection unit 402 and a first current limiting unit 403 that are connected in series. The overcurrent-automatic-disconnection unit 402 is configured to be automatically disconnected when a current flowing through the overcurrent-automatic-disconnection unit 402 exceeds a breaking current threshold. The first current limiting unit 403 is configured to limit a current on the first branch.

The second branch includes a first controllable switch unit 404. A control terminal of the first controllable switch unit 404 is connected to the controller 401, and the first controllable switch unit 404 is configured to be open or closed under control of the controller 401.

The controller 401 is connected to the control terminal of the first controllable switch unit 404 and the protected circuit, and is configured to: when the protected circuit operates normally, control the first controllable switch unit 404 to be closed, and when a fault occurs in the protected circuit, control the first controllable switch unit 404 to be open.

It should be noted that, that the controller 401 controls, when the protected circuit operates normally, the first controllable switch unit 404 to be closed means that the controller 401 controls, when the protected circuit is not in a standby state and no fault occurs, the first controllable switch unit 404 to be closed. If the protected circuit is in the standby state, the controller 401 may control the first controllable switch unit 404 to be open, to save resources.

In this embodiment of this application, the breaker apparatus 400 is configured to disconnect the electrical connection when a fault occurs in the protected circuit. Specifically, one end of the breaker apparatus 400 may be connected to a direct current input terminal, the other end of the breaker apparatus 400 is connected to the protected circuit, and the breaker apparatus 400 is configured to disconnect an electrical connection between the direct current input terminal and the protected circuit when a fault occurs in the protected circuit. Alternatively, one end of the breaker apparatus 400 may be connected to an alternating current input terminal, the other end of the breaker apparatus 400 is connected to the protected circuit, and the breaker apparatus 400 is configured to disconnect an electrical connection between the alternating current input terminal and the protected circuit when a fault occurs in the protected circuit.

For example, the overcurrent-automatic-disconnection unit 402 may be a circuit breaker or a fuse, or may be a combination of the foregoing components. When several types of components are combined, a quantity of each type of components in the combination is not specifically limited, (for example, one circuit breaker and one fuse may be included, or one circuit breaker and a plurality of fuses may be included, or a plurality of circuit breakers and one fuse may be included, or a plurality of circuit breakers and a plurality of fuses may be included), and a connection manner of the foregoing components is not specifically limited, (for example, the foregoing components may be connected in series, or may be connected in parallel, or may be connected both in series and in parallel), provided that the overcurrent-automatic-disconnection unit 402 can be automatically disconnected when the current flowing through the overcurrent-automatic-disconnection unit 402 exceeds the breaking current threshold.

For example, the first current limiting unit 403 may be a resistor, a diode, a positive temperature coefficient (PTC) thermistor, a negative temperature system (NTC) thermistor, or a combination of the foregoing components. When several types of components are combined, the types of the components included in the combination and a quantity of each type of components are not specifically limited, (for example, one resistor and one diode may be included, a plurality of resistors and one PTC thermistor may be included, or a plurality of resistors and a plurality of NTC thermistors may be included), and a connection manner of the components is not specifically limited, (for example, the components may be connected in series, or may be connected in parallel, or may be connected both in series and in parallel), provided that the first current limiting unit 403 can provide a current limiting function. Because the first current limiting unit 403 and the overcurrent-automatic-disconnection unit 402 are connected in series on the first branch, the first current limiting unit 403 may be voltage-divided with the overcurrent-automatic-disconnection unit 402 when a system operates normally, to reduce the current flowing through the overcurrent-automatic-disconnection unit 402. In this way, a heating phenomenon of the overcurrent-automatic-disconnection unit 402 is alleviated, and a service life of the overcurrent-automatic-disconnection unit 402 is improved.

For example, the first controllable switch unit 404 may be a relay, a contactor, or a semiconductor switch, or may be a combination of the foregoing three components. When several types of components are combined, the types of the components included in the combination and a quantity of each type of components are not specifically limited, (for example, one relay and one contactor may be included, or one relay and a plurality of semiconductor switches may be included, or a plurality of relays and a plurality of contactors may be included, or a plurality of contactors and one semiconductor switch may be included), and a connection manner of the components is not specifically limited, (for example, the components may be connected in series, or may be connected in parallel, or may be may be connected both in series and in parallel), provided that the first controllable switch unit 404 can be closed or open under the control of the controller 401. That the control terminal of the first controllable switch unit 404 is connected to the controller 401 may mean: When the first controllable switch unit 404 includes only one component, a control terminal of the component is connected to the controller 401. When the first controllable switch unit 404 is a combination of the foregoing several types of components, control terminals of these components are all connected to the controller 401.

In the breaker apparatus 400 provided in this embodiment of this application, when the protected circuit operates normally, the controller 401 controls the first controllable switch unit 404 to be closed. In this case, the first branch and the second branch are shunted. Because the first current limiting unit 403 can provide a current limiting function, a value of a current flowing through the first branch is relatively small. Reducing the current flowing through the overcurrent-automatic-disconnection unit 402 can alleviate a heating phenomenon of the overcurrent-automatic-disconnection unit 402 and improve a service life of the overcurrent-automatic-disconnection unit 402. When a fault occurs in the protected circuit, the controller 401 controls the first controllable switch unit 404 to be open. In this case, the second branch is cut off, the current all flows through the overcurrent-automatic-disconnection unit 402, the current flowing through the overcurrent-automatic-disconnection unit 402 exceeds the breaking current threshold of the overcurrent-automatic-disconnection unit 402, and the overcurrent-automatic-disconnection unit 402 is automatically disconnected, thereby disconnecting the electrical connection of the protected circuit.

In this embodiment of this application, the controller 401 may be connected to the first branch, and the controller 401 is further configured to: when the protected circuit is powered on, control, if a voltage value at two ends of the first branch is less than a preset voltage value, the first controllable switch unit 404 to be closed.

In the foregoing implementation, the voltage value at the two ends of the first branch is a voltage value at two ends of the second branch, and if the voltage value at the two ends of the first branch is less than the preset voltage value, the first controllable switch unit 404 is controlled to be closed. In other words, if a voltage at two ends of the first controllable switch unit 404 is relatively small, the first controllable switch unit 404 is controlled to be closed, so that the first controllable switch unit 404 can be closed at a voltage of zero or close to zero. In the foregoing solution, a requirement on a voltage withstand capability of the first controllable switch unit 404 can be reduced. Therefore, during implementation, a first controllable switch unit 404 with a relatively small specification may be selected for use, to reduce an area occupied by the breaker apparatus 400 and reduce costs of the breaker apparatus 400.

In addition, in the breaker apparatus 400, because the first controllable switch unit 404 is usually closed at a voltage of zero or close to zero, an oxide film is easily formed between contacts of the first controllable switch unit 404. Over time, the oxide film formed between the contacts causes an impedance of the first controllable switch unit 404 to gradually increase, leading to a gradual increase in a shunt current of the first branch, and causing the overcurrent-automatic-disconnection unit 402 to generate a large amount of heat.

To resolve the foregoing problem, the controller 401 may be connected to the first branch, and the controller 401 is further configured to: when a voltage value at two ends of the first branch meets a preset condition, control the first controllable switch unit 404 to be alternately open and closed, to clean the first controllable switch unit 404.

In an actual application, when a voltage at two ends of a controllable switch unit is within a preset range (for example, 10 V to 25 V), controlling the controllable switch unit to be alternately open and closed (that is, performing slight arcing between contacts of the controllable switch unit) can destroy an oxide film formed between the contacts of the controllable switch unit, thereby cleaning the controllable switch unit. In this case, in this embodiment of this application, when the voltage value at the two ends of the first branch (that is, a voltage value at two ends of the first controllable switch unit 404) meets a preset condition, the first controllable switch unit 404 is controlled to be alternately open and closed, to clean the first controllable switch unit 404. After the first controllable switch unit 404 is cleaned, the impedance of the first controllable switch unit 404 can be reduced, thereby alleviating the heating problem of the overcurrent-automatic-disconnection unit 402.

In conclusion, in the breaker apparatus 400, when the protected circuit operates normally, the controller 401 controls the first controllable switch unit 404 to be closed. In this case, the first branch and the second branch are shunted. Because the first current limiting unit 403 can provide a current limiting function, a value of a current flowing through the first branch is relatively small. Reducing the current flowing through the overcurrent-automatic-disconnection unit 402 can alleviate a heating phenomenon of the overcurrent-automatic-disconnection unit 402 and improve a service life of the overcurrent-automatic-disconnection unit. When a fault occurs in the protected circuit, the controller 401 controls the first controllable switch unit 404 to be open. In this case, the second branch is cut off, the current flowing through the overcurrent-automatic-disconnection unit 402 exceeds the breaking current threshold of the overcurrent-automatic-disconnection unit 402, and the overcurrent-automatic-disconnection unit 402 is automatically disconnected, thereby achieving breakage of the protected circuit. Therefore, the breaker apparatus 400 can be used to disconnect the electrical connection of the protected circuit when a fault occurs in the protected circuit. Compared with the solution provided in the conventional technology, the breaker apparatus 400 provided in the solution provided in this embodiment of this application includes an overcurrent-automatic-disconnection unit 402 with less heating, and therefore has higher reliability.

Figure 5:
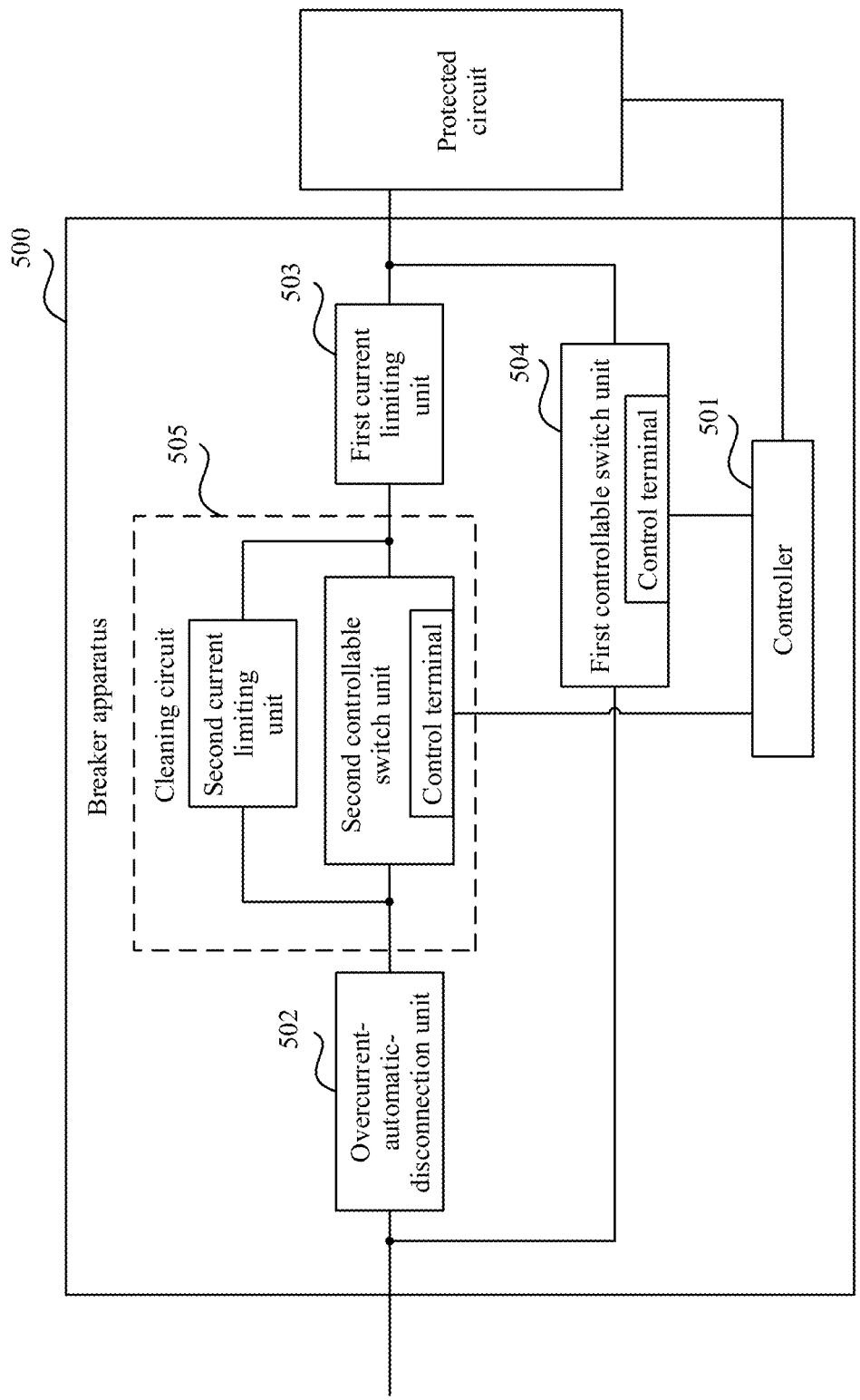
FIG. 5 is a schematic structural diagram of a second breaker apparatus according to an embodiment of this application.

An embodiment of this application further provides a breaker apparatus, configured to disconnect an electrical connection when a fault occurs in a protected circuit. Referring to FIG. 5, the breaker apparatus 500 includes a controller 501 and a first branch and a second branch that are connected in parallel.

The first branch includes an overcurrent-automatic-disconnection unit 502, a first current limiting unit 503, and a cleaning circuit 505 that are connected in series. The overcurrent-automatic-disconnection unit 502 is configured to be automatically disconnected when a current flowing through the overcurrent-automatic-disconnection unit exceeds a breaking current threshold. The first current limiting unit 503 is configured to limit a current on the first branch. The cleaning circuit 505 includes a second current limiting unit and a second controllable switch unit that are connected in parallel. A control terminal of the second controllable switch unit is connected to the controller 501, and the second controllable switch unit is configured to be open or closed under control of the controller 501.

The second branch connected in parallel to the first branch includes a first controllable switch unit 504. A control terminal of the first controllable switch unit 504 is connected to the controller 501, and the first controllable switch unit 504 is configured to be open or closed under control of the controller 501.

The controller 501 is connected to the control terminal of the first controllable switch unit 504, the control terminal of the second controllable switch unit, and the protected circuit, and is configured to: when the protected circuit operates normally, control the first controllable switch unit 504 to be closed and the second controllable switch unit to be closed, and when a fault occurs in the protected circuit, control the first controllable switch unit 504 to be open and the second controllable switch unit to be closed.

It should be noted that, that the controller 501 controls, when the protected circuit operates normally, the first controllable switch unit 404 and the second controllable switch unit to be closed means that the controller 401 controls, when the protected circuit is not in a standby state and no fault occurs, the first controllable switch unit 404 and the second controllable switch unit to be closed. If the protected circuit is in the standby state, the controller 401 may control the first controllable switch unit 404 and the second controllable switch unit to be open, to save resources.

In this embodiment of this application, the breaker apparatus 500 is configured to disconnect the electrical connection when a fault occurs in the protected circuit. Specifically, one end of the breaker apparatus 500 may be connected to a direct current input terminal, the other end of the breaker apparatus 500 is connected to the protected circuit, and the breaker apparatus 500 is configured to disconnect an electrical connection between the direct current input terminal and the protected circuit when a fault occurs in the protected circuit. Alternatively, one end of the breaker apparatus 500 may be connected to an alternating current input terminal, the other end of the breaker apparatus 500 is connected to the protected circuit, and the breaker apparatus 500 is configured to disconnect an electrical connection between the alternating current input terminal and the protected circuit when a fault occurs in the protected circuit.

In addition, in the breaker apparatus 500, for component selection of the first controllable switch unit 504 and the second controllable switch unit, reference may be made to component selection of the first controllable switch unit 404 in the breaker apparatus 400; for component selection of the overcurrent-automatic-disconnection unit 502, reference may be made to component selection of the overcurrent-automatic-disconnection unit 402 in the breaker apparatus 400; and for component selection of the first current limiting unit 503 and the second current limiting unit, reference may be made to component selection of the first current limiting unit 403 in the breaker apparatus 400. Details are not described herein again.

It is easy to understand that, compared with the conventional technology, in the breaker apparatus 500 shown in FIG. 5, both the cleaning circuit 505 and the first current limiting unit 503 that are connected in series on the first branch can provide a current limiting function, so that a current on the first branch can be reduced, and a heating phenomenon of the overcurrent-automatic-disconnection unit 502 can be alleviated, thereby improving a service life of the overcurrent-automatic-disconnection unit 502.

In addition, in the breaker apparatus 500 shown in FIG. 5, the controller 501 is further configured to: when the first controllable switch unit 504 needs to be cleaned, control the second controllable switch unit to be open, and if it is detected that a voltage value at two ends of the first branch meets a preset condition, control the first controllable switch unit 504 to alternately open and closed.

In a cleaning manner of the breaker apparatus 400 shown in FIG. 4, internal resistance of the first controllable switch unit 404 is relatively small. Therefore, to enable the voltage at the two ends of the first branch (that is, a voltage at two ends of the first controllable switch unit 404) to meet the preset condition, for example, range from 10 V to 25 V, a relatively large current needs to flow through the first controllable switch unit 404. Therefore, the direct current input terminal (or the alternating current input terminal) connected to the breaker apparatus 400 is also required to output a relatively large current to achieve cleaning.

To resolve the foregoing problem, this embodiment of this application provides the breaker apparatus 500 shown in FIG. 5. With the breaker apparatus 500, during cleaning of the first controllable switch unit 504, there is no requirement for a relatively large current to flow through a system. In the breaker apparatus 500 shown in FIG. 5, a default state of the second controllable switch unit may be a closed state. In other words, the second controllable switch unit is in the closed state when the system operates normally and a fault occurs in the protected circuit, and the second controllable switch unit is in an open state only during cleaning of the first controllable switch unit 504, to implement low-current cleaning. During specific implementations, closing or opening of the second controllable switch unit may be controlled by the controller 501.

Therefore, when the protected circuit operates normally, both the first controllable switch unit 504 and the second controllable switch unit are closed. In this case, the first branch and the second branch are shunted, and the first current limiting unit 503 and the cleaning circuit 505 provide a current limiting function. Therefore, a value of a current flowing through the first branch is relatively small, thereby alleviating a heating phenomenon of the overcurrent-automatic-disconnection unit 502. When a fault occurs in the protected circuit, the first controllable switch unit 504 is controlled to be open and the second controllable switch unit is controlled to be closed. In this case, the second branch is cut off, the current all flows through the overcurrent-automatic-disconnection unit 502, and the overcurrent-automatic-disconnection unit 502 is automatically disconnected. In particular, when the first controllable switch unit 504 needs to be cleaned (that is, when a voltage value at two ends of the first branch meets a preset condition), the controller 501 controls the second controllable switch unit to be open. In this case, both the first current limiting unit 503 and the second current limiting unit provide a current limiting function. Therefore, compared with the breaker apparatus 400 shown in FIG. 4, in the breaker apparatus 500 shown in FIG. 5, the second branch has a relatively large shunt. Therefore, if a current in the system is relatively small, a voltage value of the first controllable switch unit 504 more easily meets the preset condition, so that cleaning of the first controllable switch unit 504 is more easily triggered.

In addition, in the breaker apparatus 500 shown in FIG. 5, when the system operates normally, because both the cleaning circuit 505 and the first current limiting unit 503 can provide a current limiting function, the first current limiting unit 503 may select a relatively small resistance value. In this case, after a fault occurs in the protected circuit, the first controllable switch unit 504 is open. In this case, the current all flows through the first branch. Because a resistance value of the first branch is relatively small (the first current limiting unit 503 may select a relatively small resistance value), the voltage at the two ends of the first branch (that is, a voltage that the first controllable switch unit 504 withstands when the first controllable switch unit 504 is open) is also relatively small. Therefore, the first controllable switch unit 504 may have a relatively small size, thereby reducing costs.

Moreover, in the breaker apparatus 500 shown in FIG. 5, during cleaning of the first controllable switch unit 504, two current limiting units, namely, the first current limiting unit 503 and the second current limiting unit, are connected in series in the first branch. Therefore, a current flowing through the first branch is relatively small, and heating of the overcurrent-automatic-disconnection unit 502 is further reduced, thereby protecting the overcurrent-automatic-disconnection unit 502 as much as possible during the cleaning process.

In an embodiment, the controller 501 may be connected to the first branch, and the controller 501 is further configured to: when the protected circuit is powered on, if a voltage value at two ends of the first branch is less than a preset voltage value, control the first controllable switch unit 504 to be closed. In this way, the first controllable switch unit 504 can be closed at a voltage of zero or close to zero, thereby reducing a requirement on a voltage withstand capability of the first controllable switch unit 504. Therefore, during implementation, a first controllable switch unit 504 with a relatively small specification may be selected for use, to reduce an area occupied by the breaker apparatus 500 and reduce costs of the breaker apparatus 500.

In conclusion, in the breaker apparatus 500, when the protected circuit operates normally, the controller 501 controls the first controllable switch unit 504 and the second controllable switch unit to be closed. In this case, the first branch and the second branch are shunted. Because the first current limiting unit 503 and the cleaning circuit 505 can provide a current limiting function, a value of a current flowing through the first branch is relatively small. Reducing the current flowing through the overcurrent-automatic-disconnection unit 502 can alleviate a heating phenomenon of the overcurrent-automatic-disconnection unit 502 and improve a service life of the overcurrent-automatic-disconnection unit 502. When a fault occurs in the protected circuit, the controller 501 controls the first controllable switch unit 504 to be open and the second controllable switch unit to be closed. In this case, the second branch is cut off, the current flowing through the overcurrent-automatic-disconnection unit 502 exceeds the breaking current threshold of the overcurrent-automatic-disconnection unit 502, and the overcurrent-automatic-disconnection unit 502 is automatically disconnected, thereby disconnecting the electrical connection of the protected circuit. Therefore, the breaker apparatus 500 can be used to disconnect the electrical connection of the protected circuit when a fault occurs in the protected circuit. Compared with the solution provided in the conventional technology, the breaker apparatus 500 provided in the solution provided in this embodiment of this application includes an overcurrent-automatic-disconnection unit 502 with less heating, and therefore has higher reliability.

The following describes in detail the breaker apparatus provided in the embodiments of this application by using three examples separately. It should be noted that the breaker apparatus provided in FIG. 6 to FIG. 8 may be considered as an example of the breaker apparatus 400 or the breaker apparatus 500.

Example 1

Figure 6:
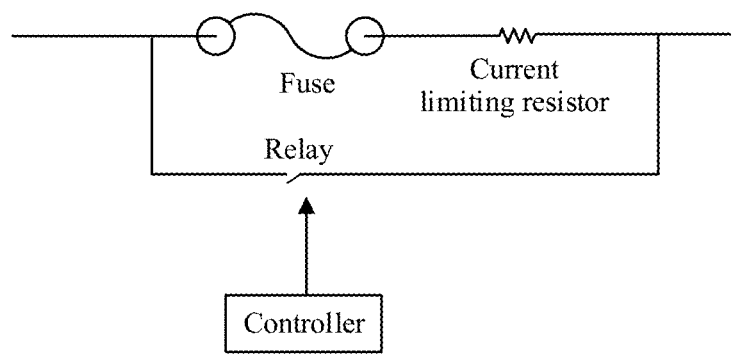
FIG. 6 is a schematic structural diagram of a third breaker apparatus according to an embodiment of this application.

FIG. 6 shows a breaker apparatus according to an embodiment of this application. The breaker apparatus is connected in series between a direct current input terminal and a protected circuit. When a fault occurs in the protected circuit, the breaker apparatus disconnects an electrical connection between the direct current input terminal and the protected circuit.

The breaker apparatus shown in FIG. 6 includes a fuse, a current limiting resistor, a relay, and a controller. The fuse and the current limiting resistor are connected in series and then connected in parallel with the relay. The controller is configured to control the relay to be closed or open.

A working principle of the breaker apparatus shown in FIG. 6 is as follows: During normal working, the controller controls the relay to be closed, and a current is shunted through two branches: a series branch of the fuse and the current limiting resistor and a branch of the relay. Because impedance of the series branch of the fuse and the current limiting resistor may be greatly greater than that of the branch of the relay, most of the current flows through the relay, and only a very small amount current flows through the fuse. Therefore, the fuse is not easily heated, and a service life of the fuse can be improved. When a short circuit fault occurs in the protected circuit, the controller controls the relay to be open, and the current flows through the series branch of the fuse and the current limiting resistor. In this case, a voltage at two ends of contacts of the relay is very low, and the relay is open at a low voltage. After the relay is completely open, a current flowing through the fuse is greatly greater than a specification of the fuse (that is, a breaking current threshold of the fuse), and the fuse is automatically blown. In this way, the electrical connection between the direct current input terminal and the protected circuit is disconnected, thereby protecting the protected circuit.

In addition, in a case of a same current, the controller may detect a voltage at two ends of the series branch of the fuse and the current limiting resistor. When the voltage reaches a predetermined value, the controller may control the relay to be alternately closed or open, and clean an oxide film formed between the contacts of the relay, thereby reducing contact impedance of the relay.

The following describes, by using an example, a working process and a technical effect of the breaker apparatus shown in FIG. 6.

First, some parameters of the breaker apparatus are described: A direct current specification output from the direct current input terminal is 1500 V-50 A. A resistance value of the current limiting resistor is 5Ω. The specification of the fuse is 1500 V-5 A. A specification of the relay is 250 V-30 A. The contact impedance of the relay is 5 mΩ. Impedance of the fuse is 71 mΩ.

If no current limiting resistor is added to the breaker apparatus (that is, in the conventional technology), when the system operates normally, two branches of the fuse and the relay are shunted, and the fuse has a shunt current of 50 A*5 mΩ/(5 mΩ+71 mΩ)≈3.28 A. In this case, power consumption of the fuse reaches 0.76 W, and heating is severe. If a current limiting resistor of 5Ω is added, the fuse has a shunt current of 50 A*5 mΩ/(5 mΩ+71 mΩ+5 S2)≈0.049 A. In this case, power consumption of the fuse is only 0.00017 W, and there is almost no heating.

In the breaker apparatus shown in FIG. 6, when a short circuit fault occurs in the protected circuit, the controller controls the relay to be open, the current turns to the series branch of the fuse and the current limiting resistor. A voltage at two ends of the branch is 50 A*(71 mΩ+5Ω) 250 V. The relay is completely open before the fuse is blown. A voltage during opening of the relay is always 250 V, and meets the specification of 250 V of the relay, thereby ensuring reliable opening of the relay. After the relay is open, the fuse is blown based on a specification blowing time.

In addition, when detecting that the voltage of the series branch of the fuse and the current limiting resistor falls within 10 V and 25 V, the controller can control the relay to be alternately closed or open, and perform slight arcing between the contacts, to eliminate the oxide film that is formed over a long time between the two ends of the contacts of the relay and reduce the contact impedance of the relay, thereby alleviating heating of the fuse.

It should be noted that the breaker apparatus shown in FIG. 6 may be considered as an example of the breaker apparatus 400. For implementations and technical effects that are not described in detail in the breaker apparatus shown in FIG. 6, refer to related descriptions in the breaker apparatus 400.

Example 2

Figure 7:
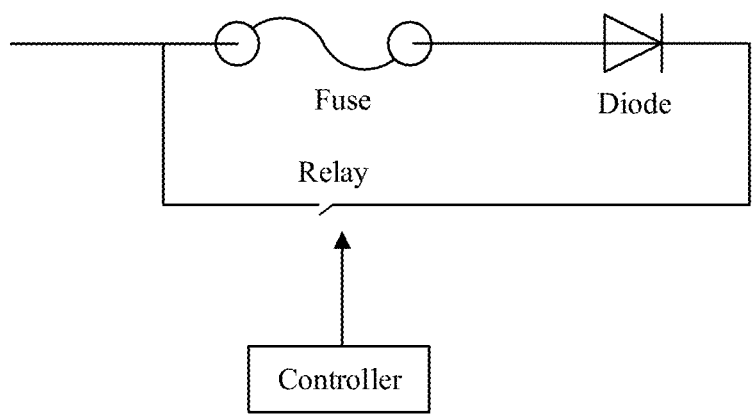
FIG. 7 is a schematic structural diagram of a fourth breaker apparatus according to an embodiment of this application.

FIG. 7 shows a breaker apparatus according to an embodiment of this application. The breaker apparatus is connected in series between a direct current input terminal and a protected circuit. When a fault occurs in the protected circuit, the breaker apparatus disconnects an electrical connection between the direct current input terminal and the protected circuit.

The breaker apparatus shown in FIG. 7 includes a fuse, a diode, a relay, and a controller. The fuse and the diode are connected in series and then connected in parallel with the relay. The controller is configured to control the relay to be closed or open.

A working principle of the breaker apparatus shown in FIG. 7 is as follows: During normal working, the controller controls the relay to be closed, and a current is shunted through two branches: a series branch of the fuse and the diode and a branch of the relay. Because a turn-on voltage drop of the series branch of the fuse and the diode acts on the branch of the relay, most of the current flows through the relay at this time, and only a very small amount of current flows through the fuse. Therefore, the fuse is not easily heated, and a service life of the fuse can be improved. When a short circuit fault occurs in the protected circuit, the controller controls the relay to be open, and the current flows through the series branch of the fuse and the diode. In this case, a voltage at two ends of contacts of the relay is very low, and the relay is open at a low voltage. After the relay is completely open, a current flowing through the fuse is greatly greater than a specification of the fuse (that is, a breaking current threshold of the fuse), and the fuse is automatically blown. In this way, the electrical connection between the direct current input terminal and the protected circuit is disconnected, thereby protecting the protected circuit.

In addition, the fuse may be connected in series with a plurality of diodes and then connected in parallel with the relay. In a case of a same current, the controller may detect a voltage at two ends of the series branch of the fuse and the diode. When the voltage reaches a predetermined value, the controller may control the relay to be alternately closed or open, and clean an oxide film formed between the contacts of the relay, thereby reducing contact impedance of the relay.

The following describes, by using an example, a working process and a technical effect of the breaker apparatus shown in FIG. 7.

First, some parameters of the breaker apparatus are described: A direct current specification output from the direct current input terminal is 1500 V-50 A. A turn-on voltage drop of the diode is 0.2 V. The specification of the fuse is 1500 V-5 A. A specification of the relay is 30 V-30 A. The contact impedance of the relay is 5 mΩ. Impedance of the fuse is 71 mΩ.

If no diode is added to the breaker apparatus (that is, in the conventional technology), when the system operates normally, two branches of the fuse and the relay are shunted, and the fuse has a shunt current of 50 A*5 mΩ/(5 mΩ+71 mΩ)≈3.28 A. In this case, power consumption of the fuse reaches 0.76 W, and heating is severe. If the diode with a turn-on voltage drop of 0.2 V is added, and assuming that the fuse has a shunt current of I, based on equal voltages of the two branches, it can be deduced that 0.2 V+71 mΩ*I=(50 A−I)*5 mΩ. Based on this, it can be calculated that I=0.65 A. In this case, power consumption of the fuse is only 0.03 W, and there is almost no heating.

In the breaker apparatus shown in FIG. 7, when a fault occurs in the circuit, the controller controls the relay to be open, the current turns to the series branch of the fuse and the diode. A voltage at two ends of the branch is 50 A*71 mΩ+0.2 V≈3.75 V. The relay is completely open before the fuse is blown. A voltage during opening of the relay is always 3.75 V, and meets the specification of 30 V of the relay, thereby ensuring reliable opening of the relay. After the relay is open, the fuse is blown based on a specification blowing time.

In addition, if the fuse is connected in series with a plurality of diodes, when the controller detects that the voltage of the series branch of the fuse and the diode falls within 10 V and 25 V, the controller may control the relay to be alternately closed or open, and perform slight arcing between the contacts, to eliminate the oxide film formed over a long time between the two ends of the contacts of the relay, and reduce the contact impedance of the relay, thereby alleviating heating of the fuse.

It should be noted that the breaker apparatus shown in FIG. 7 may be considered as an example of the breaker apparatus 400. For implementations and technical effects that are not described in detail in the breaker apparatus shown in FIG. 7, refer to related descriptions in the breaker apparatus 400.

Example 3

Figure 8:
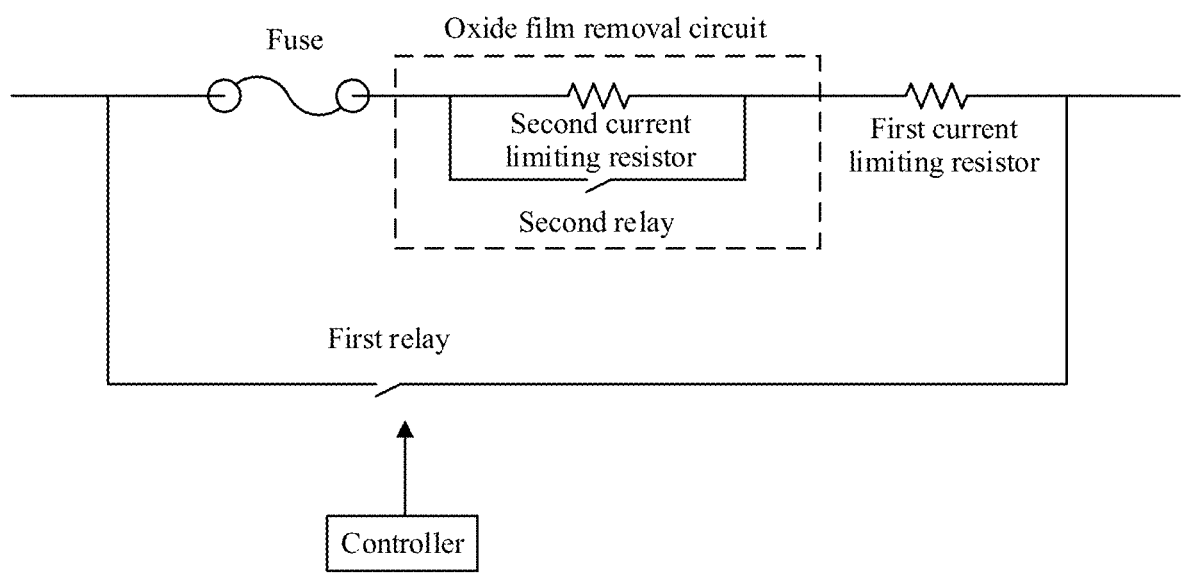
FIG. 8 is a schematic structural diagram of a fifth breaker apparatus according to an embodiment of this application.

FIG. 8 shows a breaker apparatus according to an embodiment of this application. The breaker apparatus is connected in series between a direct current input terminal and a protected circuit. When a fault occurs in the protected circuit, the breaker apparatus disconnects an electrical connection between the direct current input terminal and the protected circuit.

The breaker apparatus shown in FIG. 8 includes a fuse, an oxide film removal circuit, a first relay, a controller, and a first current limiting resistor. The oxide film removal circuit includes a second relay and a second current limiting resistor that are connected in parallel, and the second relay is a normally closed relay. The fuse, the first current limiting resistor, and the oxide film removal circuit are connected in series, and then connected in parallel with the first relay. The controller is configured to control the first relay to be closed or open, and control the second relay to be closed or open.

The oxide film removal circuit is an example of the foregoing cleaning circuit.

A working principle of the breaker apparatus shown in FIG. 8 is as follows: During normal working, the controller controls the first relay to be closed, and a current is shunted through two branches: a series branch of the fuse, the oxide film removal circuit, and the first current limiting resistor and a branch of the first relay. Because resistance of the series branch of the fuse, the first current limiting resistor, and the oxide film removal circuit is greatly greater than contact resistance of the first relay, most of the current flows through the first relay, and only a very small amount of current flows through the fuse. Therefore, the fuse is not easily heated, and a service life of the fuse can be improved. When a short circuit fault occurs in the protected circuit, the controller controls the first relay to be open, and a current flows through the series branch of the fuse, the first current limiting resistor, and the oxide film removal circuit. In this case, a voltage at two ends of contacts of the first relay is very low, and the first relay is open at a low voltage. Therefore, a first relay with a low-voltage specification may be selected for use, thereby reducing costs. After the first relay is completely open, a current flowing through the fuse is greatly greater than a specification of the fuse (that is, a breaking current threshold of the fuse), and the fuse is automatically blown. In this way, the electrical connection between the direct current input terminal and the protected circuit is disconnected, thereby protecting the protected circuit.

In addition, the controller may control the second relay to be open and the first relay to be open, connect the second current limiting resistor, the first current limiting resistor, and the fuse in series, and increase impedance of the series branch of the fuse, the first current limiting resistor, and the oxide film removal circuit, to increase the voltage at the two ends of the contacts of the first relay if the direct current input terminal outputs a relatively small current. When the voltage reaches 10 V to 25 V, the controller may control the first relay to be alternately closed or open, to clean an oxide film formed between the contacts of the first relay, thereby reducing the contact impedance of the first relay.

The following describes, by using a specific example, a working process and a technical effect of the breaker apparatus shown in FIG. 8.

First, some parameters of the breaker apparatus are described: A direct current specification output from the direct current input terminal is 1500 V-50 A. The first current limiting resistor is 0.3Ω. The second current limiting resistor is 2000Ω. The specification of the fuse is 1500 V-5 A. A specification of the first relay is 30 V-30 A. A specification of the second relay is 30 V-5 A. The contact impedance of the first relay and contact impedance of the second relay are both 5 Ω. Impedance of the fuse is 71Ω. The second relay is a normally closed relay.

If no first current limiting resistor and no oxide film removal circuit are added to the breaker apparatus (that is, in the conventional technology), when the system operates normally, two branches of the fuse and the first relay are shunted, and the fuse has a shunt current of 50 A*5 mΩ/(5 mΩ+71 mΩ)≈3.28 A. In this case, power consumption of the fuse reaches 0.76 W, and heating is severe. If the first current limiting resistor and the oxide film removal circuit are added, the fuse has a shunt current of 50 A*5 mΩ/(5 mΩ+71 mΩ+0.3Ω)≈0.66 A. In this case, power consumption of the fuse is only 0.031 W, and there is almost no heating.

In the breaker apparatus shown in FIG. 8, when a short circuit fault occurs in the protected circuit, the controller controls the first relay to be open, the current turns to the series branch of the fuse, the first current limiting resistor, and the oxide film removal circuit. A voltage at two ends of the branch is 50 A*(71 mΩ+5 mΩ+0.3Ω)≈18.8 V. The first relay is completely open before the fuse is blown. A voltage during opening of the first relay is always 18.8 V, and meets the specification of 30 V of the first relay, thereby ensuring reliable opening of the first relay. After the first relay is open, the fuse is blown based on a specification blowing time.

In addition, the controller may control the second relay to be open and the first relay to be open, connect the second current limiting resistor, the first current limiting resistor, and the fuse in series, and increase impedance of the series branch of the fuse, the first current limiting resistor, and the oxide film removal circuit. When a low current (for example, 5 mA to 10 mA) is applied, the voltage at the two ends of the contacts of the first relay may be increased to between 10 V and 25 V. In this case, the controller may control the first relay to be alternately closed or open to perform slight arcing between the contacts, to eliminate an oxide film that is formed over a long time between the two ends of the contacts of the relay reduce the impedance of the relay, thereby alleviating heating of the fuse.

It should be noted that the breaker apparatus shown in FIG. 8 may be considered as an example of the breaker apparatus 500. For implementations and technical effects that are not described in detail in the breaker apparatus shown in FIG. 8, refer to related descriptions in the breaker apparatus 500.

It should also be noted that the breaker apparatuses shown in FIG. 6 to FIG. 8 are only examples of the embodiments of this application. In an actual application, the breaker apparatus provided in the embodiments of this application is not limited to the foregoing three types. For example, one or more diodes may be connected in series in the series branch of the fuse and the current limiting resistor in the breaker apparatus shown in FIG. 6, to form another breaker apparatus. For example, one or more current limiting resistors may be connected in series in the series branch of the fuse and the diode in the breaker apparatus shown in FIG. 7, to form another breaker apparatus. For another example, the first current limiting resistor in the breaker apparatus shown in FIG. 8 may be replaced with a diode, to form another breaker apparatus. These breaker apparatuses may all be considered as the breaker apparatus provided in the embodiments of this application. For a specific working principle thereof, refer to analysis manners in the breaker apparatuses shown in FIG. 6 to FIG. 8. Details are not described herein again.

Figure 9:
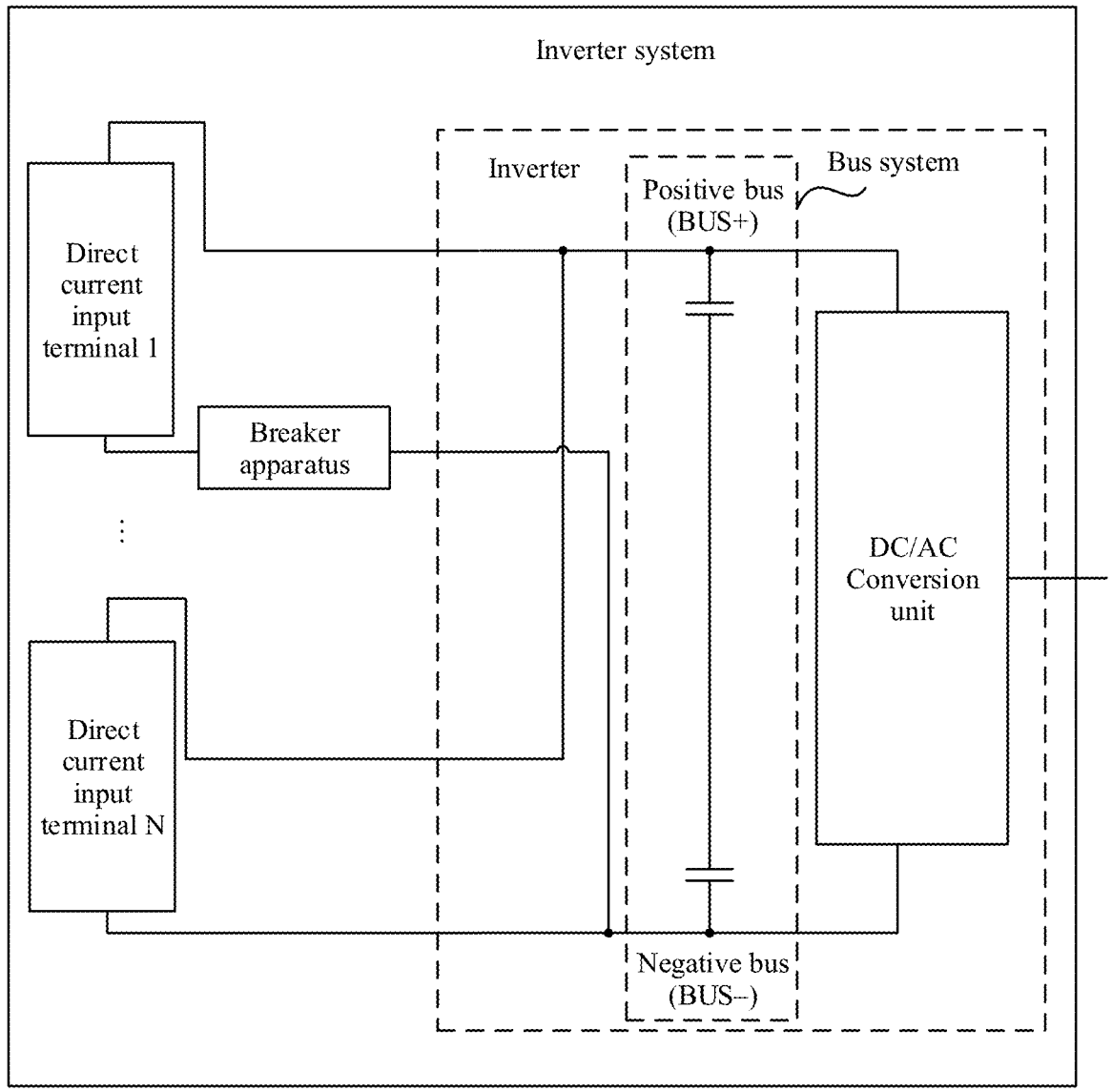
FIG. 9 is a schematic structural diagram of a second inverter system according to an embodiment of this application.

Based on a same inventive concept, an embodiment of this application further provides an inverter system. The inverter system may be considered as an example of the power system shown in FIG. 2. Referring to FIG. 9, the inverter system includes at least one direct current input terminal, at least one breaker apparatus, a bus unit, and a DC/AC conversion unit. The breaker apparatus is connected in series between a negative electrode of the direct current input terminal and a negative electrode of the bus unit, and a positive electrode of the direct current input terminal is connected to a positive electrode of the bus unit. Alternatively, the breaker apparatus is connected in series between a positive electrode of the direct current input terminal and a positive electrode of the bus unit, and a negative electrode of the direct current input terminal is connected to a negative electrode of the bus unit. Alternatively, the breaker apparatus is connected in series between negative electrodes of some direct current input terminals and a negative electrode of the bus unit, and a positive electrode of the direct current input terminal is connected to a positive electrode of the bus unit. Alternatively, the breaker apparatus is connected in series between positive electrodes of some direct current input terminals and a positive electrode of the bus unit, and a negative electrode of the direct current input terminal is connected to a negative electrode of the bus unit. Alternatively, some breaker apparatuses are connected in series between a negative electrode of the direct current input terminal and a negative electrode of the bus unit, and some other breaker apparatuses are connected in series between a positive electrode of the direct current input terminal and a positive electrode of the bus unit. The bus unit is connected to the DC/AC conversion unit. Specifically, in FIG. 10, that the breaker apparatus is connected in series between the negative electrode of the direct current input terminal and the negative electrode of the bus unit is merely used as an example for illustration.

Specifically, the breaker apparatus may include: a first branch, including an overcurrent-automatic-disconnection unit and a first current limiting unit that are connected in series, where the overcurrent-automatic-disconnection unit is configured to be automatically disconnected when a current flowing through the overcurrent-automatic-disconnection unit exceeds a breaking current threshold, and the first current limiting unit is configured to limit a current on the first branch; a second branch, connected in parallel to the first branch and including a first controllable switch unit, where a control terminal of the first controllable switch unit is connected to a controller, and the first controllable switch unit is configured to be open or closed under control of the controller; and the controller, connected to the control terminal of the first controllable switch unit, and configured to: when the inverter system operates normally, control the first controllable switch unit to be closed, and when a fault occurs in the inverter system, control the first controllable switch unit to be open.

Figure 10:
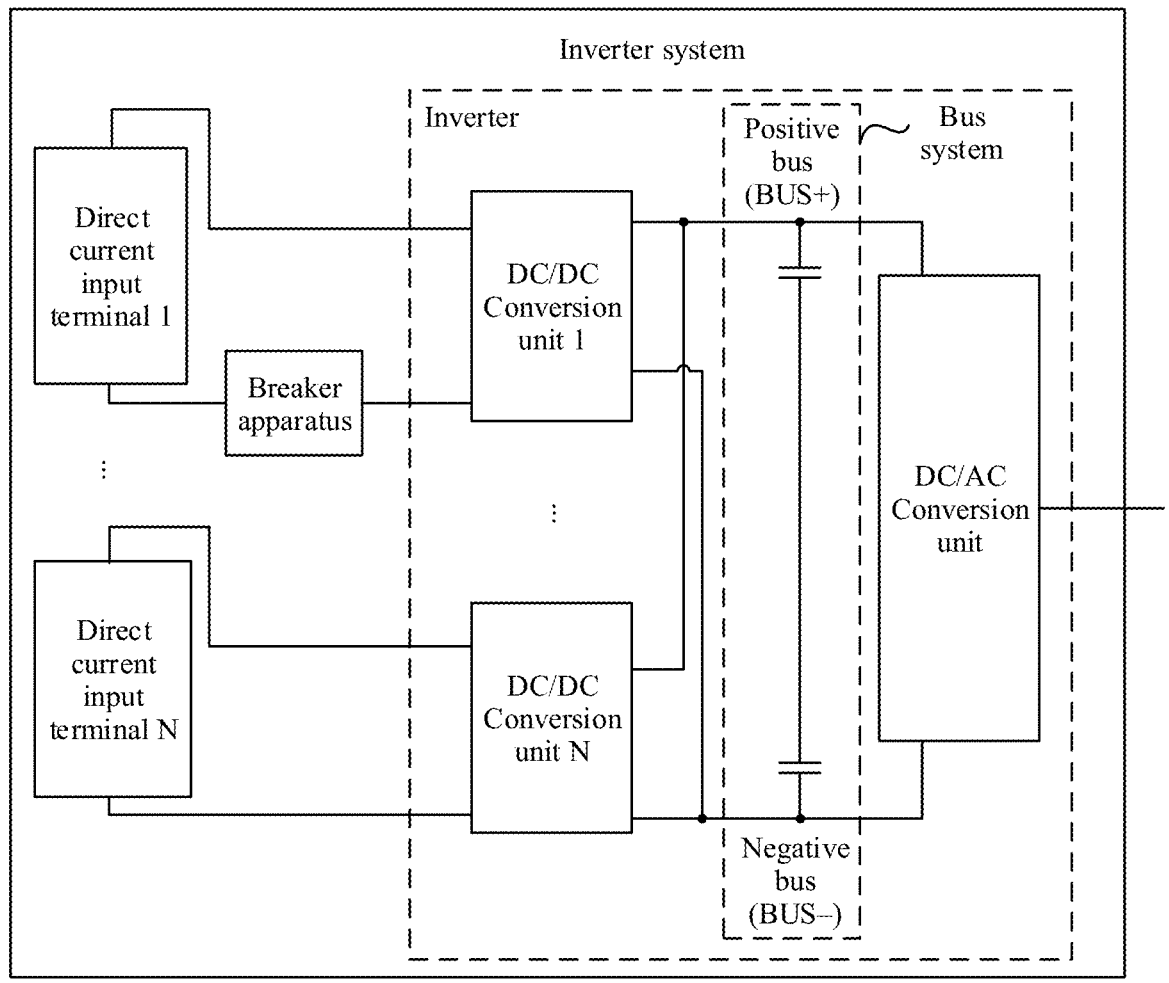
FIG. 10 is a schematic structural diagram of a third inverter system according to an embodiment of this application.

In addition, the inverter system shown in FIG. 9 may further include at least one DC/DC conversion unit that is in a one-to-one correspondence with the at least one direct current input terminal. As shown in FIG. 10, a positive output terminal of the DC/DC conversion unit is connected to the positive electrode of the bus unit. A negative output terminal of the DC/DC conversion unit is connected to the negative electrode of the bus unit.

The breaker apparatus is connected in series between the negative electrode of the direct current input terminal and a negative input terminal of the DC/DC conversion unit, and the positive electrode of the direct current input terminal is connected to a positive input terminal of the DC/DC conversion unit. Alternatively, the breaker apparatus is connected in series between the positive electrode of the direct current input terminal and a positive input terminal of the DC/DC conversion unit, and the negative electrode of the direct current input terminal is connected to a negative input terminal of the DC/DC conversion unit. Alternatively, the breaker apparatus is connected in series between the negative electrode of the direct current input terminal and negative input terminals of some DC/DC conversion units, and the positive electrode of the direct current input terminal is connected to a positive input terminal of the DC/DC conversion unit. Alternatively, the breaker apparatus is connected in series between the positive electrode of the direct current input terminal and positive input terminals of some DC/DC conversion units, and the negative electrode of the direct current input terminal is connected to a negative input terminal of the DC/DC conversion unit. Alternatively, some breaker apparatuses are connected in series between the negative electrode of the direct current input terminal and a negative input terminal of the DC/DC conversion unit, and some other breaker apparatuses are connected in series between the positive electrode of the direct current input terminal and a positive input terminal of the DC/DC conversion unit.

It should be noted that in the examples in both FIG. 9 and FIG. 10, that the inverter system includes one breaker apparatus is used as an example for illustration. In an actual application, the inverter system may include one or more breaker apparatuses. For example, for the inverter system shown in FIG. 10, one breaker apparatus may be provided for each DC/DC conversion unit. After such disposing, a structure of the inverter system may be shown in FIG. 11. In addition, a positive power cable and a negative power cable each may be provided with a breaker apparatus.

In the breaker apparatus of the inverter system, the first controllable switch unit is any one or any series or parallel combination of the following: a relay, a contactor, and a semiconductor switch. The first current limiting unit is any one or any series or parallel combination of the following: a resistor, a diode, a PTC thermistor, and an NTC thermistor. The overcurrent-automatic-disconnection unit is any one or any series or parallel combination of the following: a circuit breaker and a fuse.

In an embodiment, in the breaker apparatus, the controller is connected to the first branch, and the controller is further configured to: when a voltage value at two ends of the first branch meets a preset condition, control the first controllable switch unit to be alternately open and closed, to clean the first controllable switch unit.

In addition, the first branch may further include a cleaning circuit. The cleaning circuit includes a second current limiting unit and a second controllable switch unit that are connected in parallel. A control terminal of the second controllable switch unit is connected to the controller, and the second controllable switch unit is configured to be open or closed under control of the controller. The controller is further configured to: when the first controllable switch unit needs to be cleaned, control the second controllable switch unit to be open, and when it is detected that the voltage value at the two ends of the first branch meets the preset condition, control the first controllable switch unit to be alternately open and closed.

A default state of the second controllable switch unit is a closed state.

Figure 11:
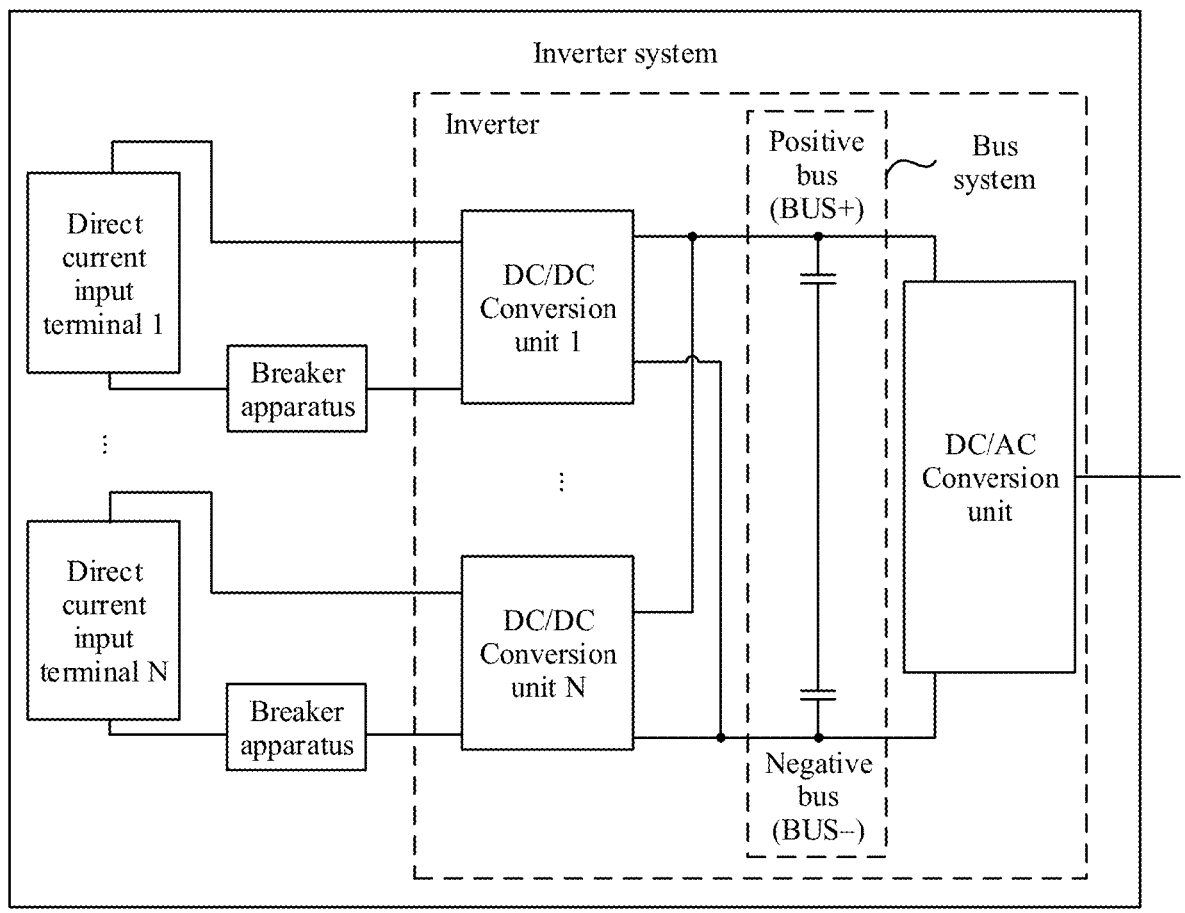
FIG. 11 is a schematic structural diagram of a fourth inverter system according to an embodiment of this application.

It should be noted that, in the inverter systems shown in FIG. 9 to FIG. 11, for other implementation forms and technical effects of the breaker apparatus, reference may be made to related descriptions in the breaker apparatus 400 or the breaker apparatus 500. Details are not described herein again.

Figure 12:
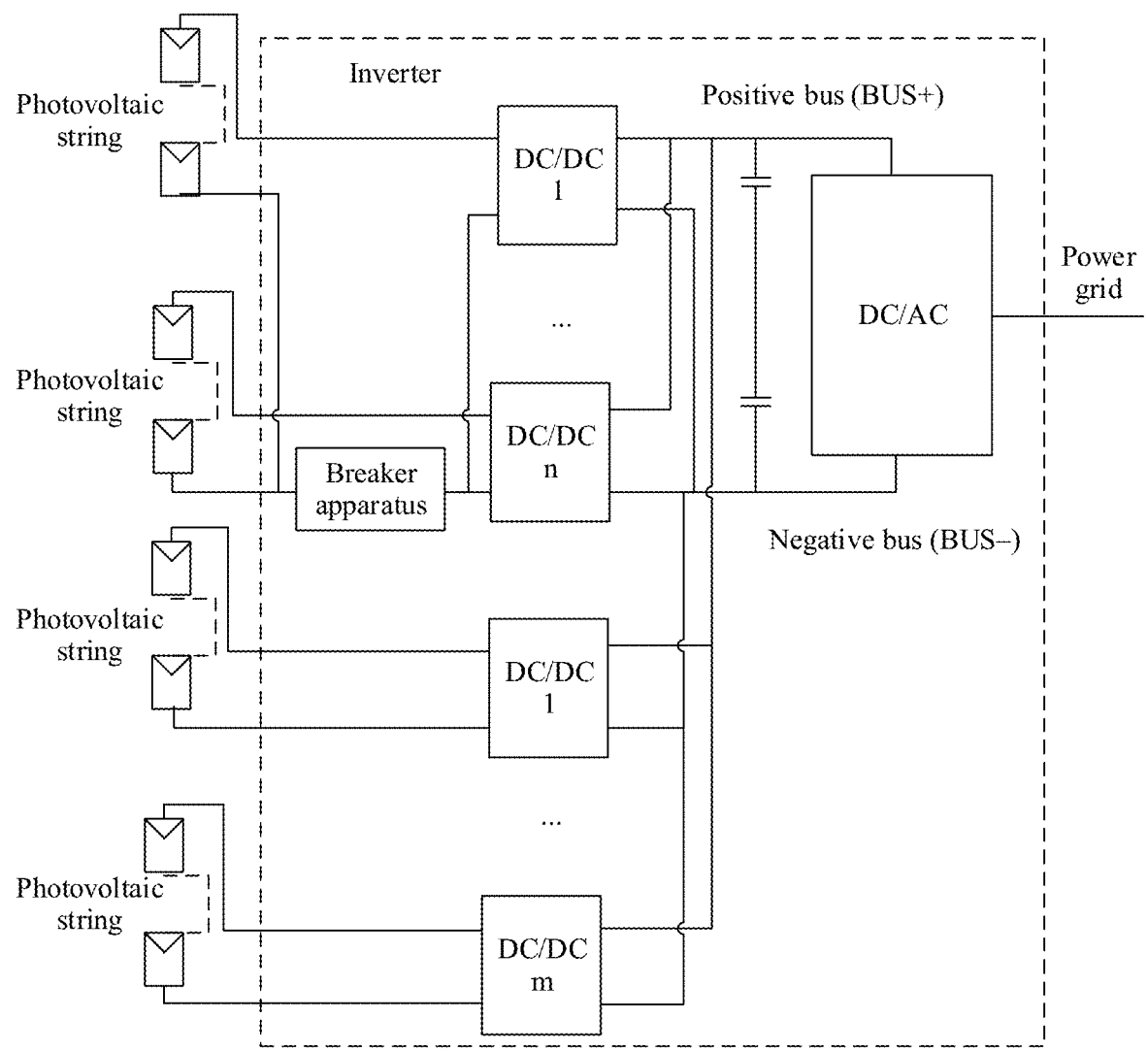
FIG. 12 is a schematic structural diagram of a fifth inverter system according to an embodiment of this application.

Certainly, in an actual application, there are various forms of inverter systems. Regardless of a form used, the breaker apparatus 400 or the breaker apparatus 500 provided in the embodiments of this application can be used to protect the inverter system. For example, the breaker apparatus 400 or the breaker apparatus 500 provided in the embodiments of this application may also be added to the inverter system shown in FIG. 12. When a short circuit fault occurs in the inverter system, a direct current power supply of a battery panel string is cut off by using the breaker apparatus 400 or the breaker apparatus 500, to protect the inverter system.

What is claimed is:

1. A breaker apparatus, comprising:
a controller;
a first branch, comprising an overcurrent-automatic-disconnection unit and a first current limiting unit that are connected in series, wherein the overcurrent-automatic-disconnection unit is configured to be automatically disconnected when a current flowing through the overcurrent-automatic-disconnection unit exceeds a breaking current threshold, and wherein the first current limiting unit is configured to limit a current on the first branch;
a second branch, connected in parallel to the first branch and comprising a first controllable switch unit, wherein the first controllable switch unit includes a control terminal connected to the controller, and is configured to be open or closed under control of the controller;
wherein the controller is connected to the control terminal of the first controllable switch unit, and a protected circuit, and is configured to:
(1) when the protected circuit operates normally, close the first controllable switch unit,
(2) when a fault occurs in the protected circuit, open the first controllable switch unit, and
(3) when a voltage value at two ends of the first branch meets a preset condition, alternatively open and close the first controllable switch unit to clean the first controllable switch unit; and
wherein the breaker apparatus is connected in series in the protected circuit, and configured to disconnect an electrical connection when a fault occurs in the protected circuit.

2. The breaker apparatus according to claim 1, wherein the controller is connected to the first branch, and further configured to close the first controllable switch unit
when the protected circuit is powered on and a voltage value at the two ends of the first branch is less than a preset voltage value.

3. The breaker apparatus according to claim 1, wherein the first controllable switch unit is any one or any series or parallel combination of the following:
a relay, a contactor, and a semiconductor switch.

4. The breaker apparatus according to claim 1, wherein the first current limiting unit is any one or any series or parallel combination of the following:
a resistor, a diode, a positive temperature coefficient PTC thermistor, and a negative temperature system NTC thermistor.

5. The breaker apparatus according to claim 1, wherein the overcurrent-automatic-disconnection unit is any one or any series or parallel combination of the following:
a circuit breaker and a fuse.

6. A breaker apparatus, comprising:
a controller;
a first branch, comprising an overcurrent-automatic-disconnection unit, a cleaning circuit, and a first current limiting unit that are connected in series, wherein the overcurrent-automatic-disconnection unit is configured to be automatically disconnected when a current flowing through the overcurrent-automatic-disconnection unit exceeds a breaking current threshold, wherein the first current limiting unit is configured to limit a current on the first branch, wherein the cleaning circuit comprises a second current limiting unit and a second controllable switch unit that are connected in parallel, wherein the second controllable switch unit includes a control terminal connected to the controller, and is configured to be open or closed under control of the controller;
a second branch, connected in parallel to the first branch and comprising a first controllable switch unit, wherein the first controllable switch unit includes a control terminal connected to the controller, and is configured to be open or closed under control of the controller;
wherein the controller is connected to the control terminal of the first controllable switch unit, the control terminal of the second controllable switch unit, and a protected circuit, and is configured to:
(1) when the protected circuit operates normally, close the first controllable switch unit and the second controllable switch unit,
(2) when a fault occurs in the protected circuit, open the first controllable switch unit and close the second controllable switch unit, and
(3) when a voltage value at two ends of the first branch is detected to meet a preset condition, alternately open and close the first controllable switch unit; and
wherein the breaker apparatus is connected in series in the protected circuit, and is configured to disconnect an electrical connection when a fault occurs in the protected circuit.

7. The breaker apparatus according to claim 6, wherein the controller is further configured to: when the first controllable switch unit needs to be cleaned, open the second controllable switch unit.

8. The breaker apparatus according to claim 7, wherein a default state of the second controllable switch unit is a closed state.

9. The breaker apparatus according to claim 7, wherein the first controllable switch unit is any one or any series or parallel combination of the following: a relay, a contactor, and a semiconductor switch; and
wherein the second controllable switch unit is any one or any series or parallel combination of the following: a relay, a contactor, and a semiconductor switch.

10. The breaker apparatus according to claim 8, wherein the first current limiting unit is any one or any series or parallel combination of the following: a resistor, a diode, a positive temperature coefficient PTC thermistor, and a negative temperature system NTC thermistor; and
wherein the second current limiting unit is any one or any series or parallel combination of the following: a resistor, a diode, a PTC thermistor, and an NTC thermistor.

11. The breaker apparatus according to claim 6, wherein the overcurrent-automatic-disconnection unit is any one or any series or parallel combination of the following:
a circuit breaker and a fuse.

12. The breaker apparatus according to claim 6, wherein the controller is connected to the first branch, and further configured to close the first controllable switch unit
when the protected circuit is powered on and when a voltage value at two ends of the first branch is less than a preset voltage value.

13. An inverter system, comprising at least one direct current input terminal, a plurality of breaker apparatuses, a bus unit, and a DC/AC conversion unit, wherein
at least one of the breaker apparatuses is connected in series between a negative electrode of the direct current input terminal and a negative electrode of the bus unit, and wherein the direct current input terminal includes a positive electrode that is connected to a positive electrode of the bus unit; or wherein at least one of the breaker apparatuses is connected in series between a positive electrode of the direct current input terminal and a positive electrode of the bus unit, and wherein the direct current input terminal includes a negative electrode that is connected to a negative electrode of the bus unit; or wherein at least one of the breaker apparatuses is connected in series between negative electrodes of some direct current input terminals and a negative electrode of the bus unit, and wherein the direct current input terminal includes a positive electrode that is connected to a positive electrode of the bus unit; or wherein at least one of the breaker apparatuses is connected in series between positive electrodes of some direct current input terminals and a positive electrode of the bus unit, and wherein the direct current input terminal includes a negative electrode that is connected to a negative electrode of the bus unit; or wherein one or more of the plurality of breaker apparatuses are connected in series between a negative electrode of the direct current input terminal and a negative electrode of the bus unit, and wherein one or more other second set of breaker apparatuses are connected in series between a positive electrode of the direct current input terminal and a positive electrode of the bus unit, wherein the bus unit is connected to the DC/AC conversion unit; and wherein each of the breaker apparatuses comprises:

a controller;

a first branch, comprising an overcurrent-automatic-disconnection unit and a first current limiting unit that are connected in series, wherein the overcurrent-automatic-disconnection unit is configured to be automatically disconnected when a current flowing through the overcurrent-automatic-disconnection unit exceeds a breaking current threshold, and wherein the first current limiting unit is configured to limit a current on the first branch;

a second branch, connected in parallel to the first branch and comprising a first controllable switch unit, wherein the first controllable switch unit includes a control terminal connected to the controller, and is configured to be open or closed under control of the controller; and wherein the controller is connected to the control terminal of the first controllable switch unit, and configured to: when the inverter system operates normally, control the first controllable switch unit to be closed, and when a fault occurs in the inverter system, control the first controllable switch unit to be open.

14. The inverter system according to claim 13, wherein the first controllable switch unit is any one or any series or parallel combination of the following: a relay, a contactor, and a semiconductor switch;

wherein the first current limiting unit is any one or any series or parallel combination of the following: a resistor, a diode, a positive temperature coefficient PTC thermistor, and a negative temperature system NTC thermistor;

wherein the overcurrent-automatic-disconnection unit is any one or any series or parallel combination of the following: a circuit breaker and a fuse.

15. The inverter system according to claim 13, wherein the controller is connected to the first branch, and the controller is further configured to alternately open and close the first controllable switch unit when a voltage value at two ends of the first branch meets a preset condition.

16. The inverter system according to claim 13, wherein the first branch further comprises:

a cleaning circuit, wherein the cleaning circuit comprises a second current limiting unit and a second controllable switch unit that are connected in parallel, wherein the second controllable switch unit includes a control terminal connected to the controller, and is configured to be open or closed under control of the controller; and wherein the controller is further configured to: when the inverter system operates normally and when a fault occurs in the inverter system, control the second controllable switch unit to be closed; and when the first controllable switch unit needs to be cleaned, control the second controllable switch unit to be open, and if it is detected that a voltage value at two ends of the first branch meets a preset condition, control the first controllable switch unit to be alternately open and closed.

17. The inverter system according to claim 16, wherein a default state of the second controllable switch unit is a closed state.

18. The inverter system according to claim 13, further comprising:

at least one DC/DC conversion unit that is in a one-to-one correspondence with the at least one direct current input terminal, wherein the at least one DC/DC conversion unit includes a positive output terminal that is connected to the positive electrode of the bus unit, and a negative output terminal that is connected to the negative electrode of the bus unit.

19. The inverter system according to claim 18, wherein at least one of the breaker apparatuses is connected in series between the negative electrode of the direct current input terminal and a negative input terminal of the DC/DC conversion unit, and wherein the positive electrode of the direct current input terminal is connected to a positive input terminal of the DC/DC conversion unit; or wherein at least one of the breaker apparatuses is connected in series between the positive electrode of the direct current input terminal and a positive input terminal of the DC/DC conversion unit, and wherein the negative electrode of the direct current input terminal is connected to a negative input terminal of the DC/DC conversion unit; or wherein at least one of the breaker apparatuses is connected in series between the negative electrode of the direct current input terminal and negative input terminals of some DC/DC conversion units, and wherein the positive electrode of the direct current input terminal is connected to a positive input terminal of the DC/DC conversion unit; or wherein at least one of the breaker apparatuses is connected in series between the positive electrode of the direct current input terminal and positive input terminals of some DC/DC conversion units, and wherein the negative electrode of the direct current input terminal is connected to a negative input terminal of the DC/DC conversion unit; or wherein some of the breaker apparatuses are connected in series between the negative electrode of the direct current input terminal and a negative input terminal of the DC/DC conversion unit, and some other of the breaker apparatuses are connected in series between the positive electrode of the direct current input terminal and a positive input terminal of the DC/DC conversion unit.

* * * * *